United States Patent
Sung et al.

(10) Patent No.: US 10,659,758 B2
(45) Date of Patent: *May 19, 2020

(54) IMAGE ENCODING METHOD AND IMAGE DECODING METHOD

(71) Applicant: LG ELECTRONICS INC., Seoul (KR)

(72) Inventors: Jaewon Sung, Seoul (KR); Sehoon Yea, Seoul (KR); Eunyong Son, Seoul (KR); Jiwook Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 179 days.

This patent is subject to a terminal disclaimer.

(21) Appl. No.: 15/652,078

(22) Filed: Jul. 17, 2017

(65) Prior Publication Data
US 2018/0007388 A1  Jan. 4, 2018

Related U.S. Application Data

(63) Continuation of application No. 14/351,307, filed as application No. PCT/KR2012/008311 on Oct. 12, 2012, now Pat. No. 9,712,819.

(Continued)

(51) Int. Cl.
*H04N 13/161* (2018.01)
*H04N 19/52* (2014.01)
(Continued)

(52) U.S. Cl.
CPC ........... *H04N 13/161* (2018.05); *H04N 19/52* (2014.11); *H04N 19/527* (2014.11);
(Continued)

(58) Field of Classification Search
None
See application file for complete search history.

(56) References Cited

U.S. PATENT DOCUMENTS

| 7,782,943 B2 | 8/2010 | Jeon |
|---|---|---|
| 7,782,944 B2 | 8/2010 | Jeon |

(Continued)

FOREIGN PATENT DOCUMENTS

| KR | 10-2008-0008944 | 1/2008 |
|---|---|---|
| KR | 10-2008-0036910 | 4/2008 |

(Continued)

OTHER PUBLICATIONS

International Search Report dated Mar. 15, 2013 for Application No. PCT/KR2012/008311, with English Translation, 18 pages.

*Primary Examiner* — Dakshesh D Parikh
(74) *Attorney, Agent, or Firm* — Fish & Richardson P.C.

(57) ABSTRACT

A video decoding method that includes: receiving information for deriving motion information of a current block; deriving the motion information of the current block based on the received information for deriving the motion information; and performing prediction to generate predicted pixels of the current block based on the motion information of the current block, wherein the motion information of the current block is determined by using motion information of a reference block, wherein the reference block is determined based on a specific disparity vector, wherein the specific disparity vector is determined for an area in a picture to which the current block belongs, wherein the area which the specific disparity vector is determined is split based on a quad tree structure, and wherein the current block is a block of a texture picture and the reference block is a block in a reference view is disclosed.

7 Claims, 21 Drawing Sheets

Related U.S. Application Data

(60) Provisional application No. 61/546,066, filed on Oct. 12, 2011.

(51) Int. Cl.
*H04N 19/96* (2014.01)
*H04N 19/527* (2014.01)
*H04N 19/597* (2014.01)
*H04N 13/00* (2018.01)

(52) U.S. Cl.
CPC ........... *H04N 19/597* (2014.11); *H04N 19/96* (2014.11); *H04N 2013/0085* (2013.01)

(56) References Cited

U.S. PATENT DOCUMENTS

| | | |
|---|---|---|
| 7,782,945 B2 | 8/2010 | Jeon |
| 7,782,946 B2 | 8/2010 | Jeon |
| 7,782,947 B2 | 8/2010 | Jeon |
| 7,782,948 B2 | 8/2010 | Jeon |
| 7,782,949 B2 | 8/2010 | Jeon |
| 7,782,950 B2 | 8/2010 | Jeon |
| 7,817,865 B2 | 10/2010 | Yang |
| 7,817,866 B2 | 10/2010 | Yang |
| 7,831,102 B2 | 11/2010 | Yang |
| 7,856,148 B2 | 12/2010 | Yang |
| 7,970,221 B2 | 6/2011 | Yang |
| 8,115,804 B2 | 2/2012 | Yang |
| 8,154,585 B2 | 4/2012 | Yang |
| 8,170,108 B2 | 5/2012 | Jeon |
| 8,325,814 B2 | 12/2012 | Koo |
| 8,363,732 B2 | 1/2013 | Jeon |
| 2007/0177671 A1 | 8/2007 | Yang |
| 2007/0177672 A1 | 8/2007 | Yang |
| 2007/0177673 A1 | 8/2007 | Yang |
| 2007/0177674 A1 | 8/2007 | Yang |
| 2007/0177810 A1 | 8/2007 | Yang |
| 2007/0177811 A1 | 8/2007 | Yang |
| 2007/0177812 A1 | 8/2007 | Yang |
| 2007/0177813 A1 | 8/2007 | Yang |
| 2009/0279608 A1 | 11/2009 | Jeon |
| 2009/0290643 A1 | 11/2009 | Yang |
| 2009/0296811 A1 | 12/2009 | Jeon |
| 2009/0310676 A1 | 12/2009 | Yang |
| 2010/0020870 A1 | 1/2010 | Jeon |
| 2010/0026882 A1 | 2/2010 | Jeon |
| 2010/0026883 A1 | 2/2010 | Jeon |
| 2010/0026884 A1 | 2/2010 | Jeon |
| 2010/0027653 A1 | 2/2010 | Jeon |
| 2010/0027654 A1 | 2/2010 | Jeon |
| 2010/0027659 A1 | 2/2010 | Jeon |
| 2010/0027660 A1 | 2/2010 | Jeon |
| 2010/0027682 A1 | 2/2010 | Jeon |
| 2010/0046619 A1 | 2/2010 | Koo |
| 2010/0074334 A1 | 3/2010 | Jeon |
| 2010/0080293 A1 | 4/2010 | Jeon |
| 2010/0086036 A1 | 4/2010 | Jeon |
| 2010/0091843 A1 | 4/2010 | Jeon |
| 2010/0091844 A1 | 4/2010 | Jeon |
| 2010/0091845 A1 | 4/2010 | Jeon |
| 2010/0091858 A1 | 4/2010 | Yang |
| 2010/0091883 A1 | 4/2010 | Jeon |
| 2010/0091884 A1 | 4/2010 | Jeon |
| 2010/0091885 A1 | 4/2010 | Jeon |
| 2010/0091886 A1 | 4/2010 | Jeon |
| 2010/0104012 A1 | 4/2010 | Koo |
| 2010/0104014 A1 | 4/2010 | Koo |
| 2010/0111169 A1 | 5/2010 | Jeon |
| 2010/0111170 A1 | 5/2010 | Koo |
| 2010/0111171 A1 | 5/2010 | Koo |
| 2010/0111172 A1 | 5/2010 | Koo |
| 2010/0111173 A1 | 5/2010 | Koo |
| 2010/0111174 A1 | 5/2010 | Koo |
| 2010/0111183 A1 | 5/2010 | Jeon |
| 2010/0128787 A1 | 5/2010 | Jeon |
| 2010/0150234 A1 | 6/2010 | Koo |
| 2010/0150235 A1 | 6/2010 | Koo |
| 2010/0150236 A1 | 6/2010 | Koo |
| 2010/0158112 A1 | 6/2010 | Koo |
| 2010/0158113 A1 | 6/2010 | Koo |
| 2010/0158114 A1 | 6/2010 | Koo |
| 2010/0158117 A1 | 6/2010 | Koo |
| 2010/0158118 A1 | 6/2010 | Koo |
| 2010/0158129 A1* | 6/2010 | Lai ................ H04N 19/597 375/240.16 |
| 2010/0177824 A1 | 7/2010 | Koo |
| 2010/0202519 A1 | 8/2010 | Koo |
| 2010/0202521 A1 | 8/2010 | Koo |
| 2010/0215100 A1 | 8/2010 | Jeon |
| 2010/0260265 A1 | 10/2010 | Jeon |
| 2010/0266042 A1 | 10/2010 | Koo |
| 2010/0316135 A1 | 12/2010 | Jeon |
| 2010/0316136 A1 | 12/2010 | Jeon |
| 2010/0316360 A1 | 12/2010 | Jeon |
| 2010/0316361 A1 | 12/2010 | Jeon |
| 2010/0316362 A1 | 12/2010 | Jeon |
| 2011/0222602 A1 | 9/2011 | Sung |
| 2012/0121015 A1 | 5/2012 | Yang |
| 2012/0269270 A1* | 10/2012 | Chen ............... H04N 19/597 375/240.16 |
| 2014/0192154 A1* | 7/2014 | Jeong ............. H04N 19/597 348/43 |

FOREIGN PATENT DOCUMENTS

| | | |
|---|---|---|
| KR | 10-2009-0113281 | 10/2009 |
| KR | 10-2009-0129412 | 12/2009 |
| WO | 2010053332 | 5/2010 |

* cited by examiner

FIG. 13
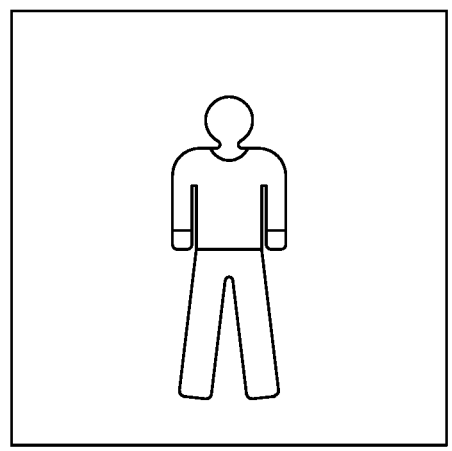
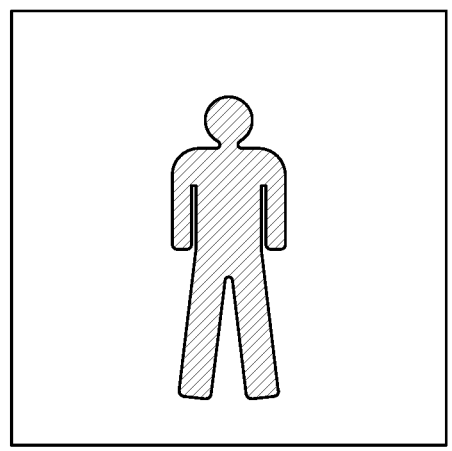
(a)                (b)

FIG. 15
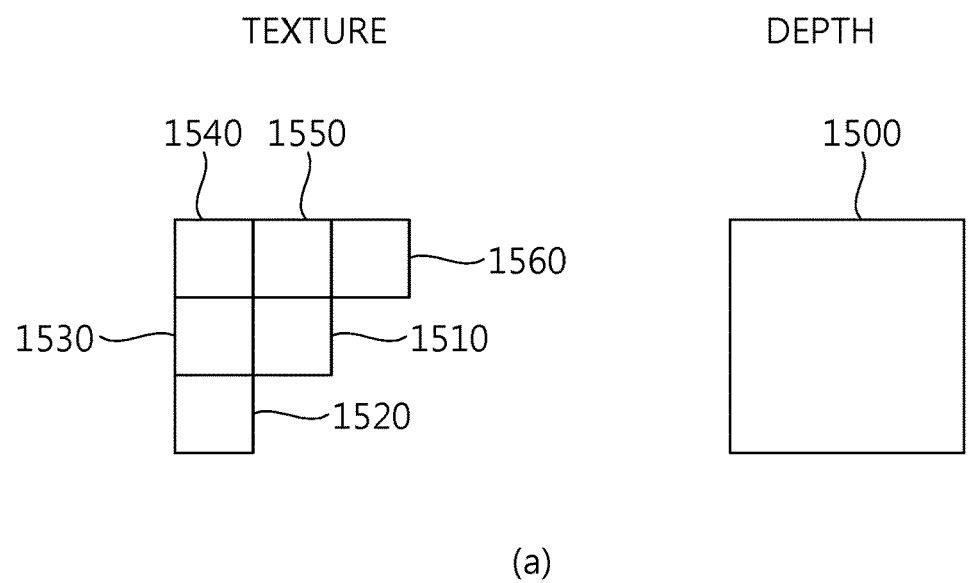
(a)
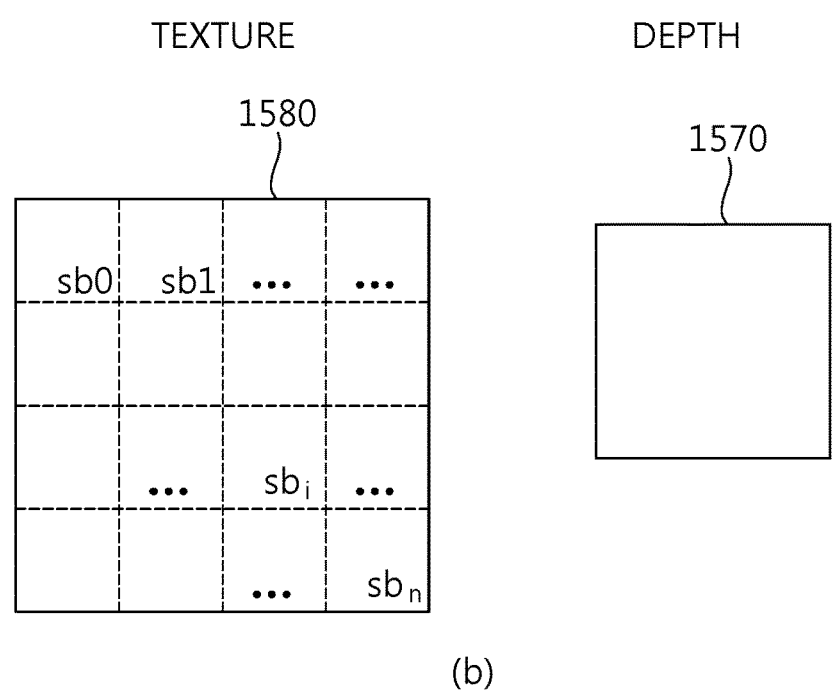
(b)

IMAGE ENCODING METHOD AND IMAGE DECODING METHOD

CROSS REFERENCE TO RELATED APPLICATIONS

This application is a continuation of U.S. application Ser. No. 14/351,307, filed on Apr. 28, 2014, which is a U.S. National Phase Application under 35 U.S.C. § 371 of International Application PCT/KR2012/008311, filed on Oct. 12, 2012, which claims the benefit of U.S. Provisional Application No. 61/546,066, filed on Oct. 12, 2011, the entire content of the prior applications is hereby incorporated by reference.

TECHNICAL FIELD

The present invention relates to an image information processing technique, and more particularly, to methods of encoding and decoding a 3D video and a device using the methods.

BACKGROUND ART

In recent years, demands for a high-resolution and high-quality video have increased in various fields of applications. However, the higher the resolution and quality video data becomes, the greater the amount of video data becomes.

Accordingly, when video data is transferred using media such as existing wired or wireless broadband lines or video data is stored in existing storage media, the transfer cost and the storage cost thereof increase. High-efficiency video compressing techniques can be used to effectively transfer, store, and reproduce high-resolution and high-quality video data.

On the other hand, with realization of capability of processing a high-resolution/high-capacity video, digital broadcast services using a 3D video have attracted attention as a next-generation broadcast service. A 3D video can provide a sense of realism and a sense of immersion using multi-view channels.

A 3D video can be used in various fields such as free viewpoint video (FVV), free viewpoint TV (FTV), 3DTV, surveillance, and home entertainments.

Unlike a single-view video, a 3D video using multi-views have a high correlation between views having the same picture order count (POC). Since the same scene is shot with multiple neighboring cameras, that is, multiple views, multi-view videos have almost the same information except for a parallax and a slight illumination difference and thus difference views have a high correlation therebetween.

Accordingly, the correlation between different views can be considered for encoding/decoding a multi-view video. For example, a block to be decoded in a current view can be predicted or decoded with reference to a block in another view. In this case, the relationship between different views can be derived and used for prediction.

DISCLOSURE OF THE INVENTION

Technical Problem

An object of the present invention is to provide a method and a device reusing motion information (for example, a motion vector) in encoding and decoding a 3D video.

Another object of the present invention is to provide a method and a device of determining or deriving motion information of a current view picture reusing motion information of another view picture in encoding and decoding a 3D video.

Still another object of the present invention is to provide a method and a device of determining or deriving motion information of a depth picture reusing motion information of a texture picture in encoding and decoding a 3D video.

Still another object of the present invention is to provide a method and a device of encoding/decoding a current view picture on the basis of motion information obtained reusing a motion vector of another view picture.

Still another object of the present invention is to provide a method and a device of encoding/decoding a depth picture on the basis of motion information obtained reusing motion information of a texture picture in.

Solution to Problem (1) According to an aspect of the present invention, there is provided a video encoding method including the steps of determining motion information of a current block; and transmitting information for deriving the motion information, wherein the step of determining the motion information of the current block includes determining the motion information of the current block reusing motion information of a reference block.

(2) In the video encoding method according to (1), the current block may be a block of a texture picture and the reference block may be a block in a reference view.

(3) In the video encoding method according to (2), the information for deriving the motion information may include at least one of information indicating that the motion information of the reference block is reused, information indicating a direction of the reference view, and information indicating a global disparity vector (GDV) of the reference block.

(4) In the video encoding method according to (2), the GDV of the reference block may determined for each area in a picture to which the current block belongs, and the area of which the GDV is determined may have a quad tree structure.

(5) In the video encoding method according to (4), the information for deriving the motion information may include largest depth information and largest size information of the quad tree structure, and may include information indicating a GDV value when the area of which the GDV is determined is an area having the largest depth.

(6) In the video encoding method according to (4), the information for deriving the motion information may include information indicating whether to split the quad tree structure, and may include information indicating a GDV value when the area of which the GDV is determined is not split.

(7) In the video encoding method according to (1), the current block may be a block of a depth picture, and the reference block may be a block of a texture picture in the same view.

(8) In the video encoding method according to (7), the motion information of the current block may be determined on the basis of the motion information of the reference block and motion information of neighboring blocks of the reference block when the current block is larger than the reference block.

(9) In the video encoding method according to (7), the motion information of the current block may be determined on the basis of motion information of sub blocks of the reference block when the current block is smaller than the reference block.

(10) In the video encoding method according to (7), the information for deriving the motion information may include offset information for compensating for a depth value of the current block reconstructed on the basis of the motion information of the reference block.

(11) According to another aspect of the present invention, there is provided a video decoding method including the steps of receiving information for deriving motion information of a current block; and deriving the motion information of the current block on the basis of the received information for deriving the motion information, wherein the step of determining the motion information of the current block includes determining the motion information of the current block reusing motion information of a reference block.

(12) In the video decoding method according to (11), the current block may be a block of a texture picture, and a block in a reference view may be set as the reference block when the information for deriving the motion information includes information indicating that the motion information of the current block is derived reusing motion information of a block in another view.

(13) In the video decoding method according to (12), the information for deriving the motion information may include information indicating a direction of the reference view and/or information indicating a global disparity vector (GDV) of the reference block.

(14) In the video decoding method according to (12), the information for deriving the motion information may include a global disparity vector (GDV) of the reference block, and the value of the GDV may be determined for each area in a picture to which the current block belongs.

(15) In the video decoding method according to (14), the area of which the GDV value is specified may have a quad tree structure, and the information for deriving the motion information may include information indicating a largest depth of the quad tree structure; and information indicating the GDV value when the current block is a GDV setting area having the largest depth.

(16) In the video decoding method according to (14), the area of which the GDV value is specified may have a quad tree structure, and the information for deriving the motion information may include information indicating whether to split the GDV setting area; and information indicating the GDV value when a GDV setting area to which the current block is not split.

(17) In the video decoding method according to (11), the current block may be a block of a depth picture, and a block of a texture picture in the same view as the depth picture may be set as the reference block when the information for deriving the motion information includes information indicating that the motion information of the current block is derived reusing the motion information of the block of the texture picture.

(18) In the video decoding method according to (17), the motion information of the current block may be derived on the basis of the motion information of the reference block and motion information of neighboring blocks of the reference block when the current block is larger than the reference block.

(19) In the video decoding method according to (17), the motion information of the current block may be derived on the basis of motion information of sub blocks of the reference block when the current block is smaller than the reference block.

(20) In the video decoding method according to (17), the information for deriving the motion information may include offset information for compensating for a depth value of the current block reconstructed on the basis of the motion information of the reference block.

Advantageous Effects

According to the present invention, it is possible to reduce an amount of information to be transmitted and to reduce complexity in processing information by reusing motion information (for example, a motion vector) in encoding and decoding a 3D video.

According to the present invention, it is possible to determine or derived motion information of a current view picture reusing motion information of another view picture.

According to the present invention, it is possible to determine or derive motion information of a depth picture reusing motion information of a texture picture.

According to the present invention, it is possible to improve coding efficiency and to reduce overhead by reusing a motion vector of another view picture for a current view picture or reusing a motion vector of a texture picture for a depth picture.

BRIEF DESCRIPTION OF THE DRAWINGS

FIG. 13 is a diagram schematically illustrating an example where a single scene is displayed in a texture picture and a depth picture.

FIG. 15 is a diagram schematically illustrating a method of deriving a motion vector of a current depth block from a motion vector of a corresponding texture block.

DESCRIPTION OF EMBODIMENTS

Figure 1:
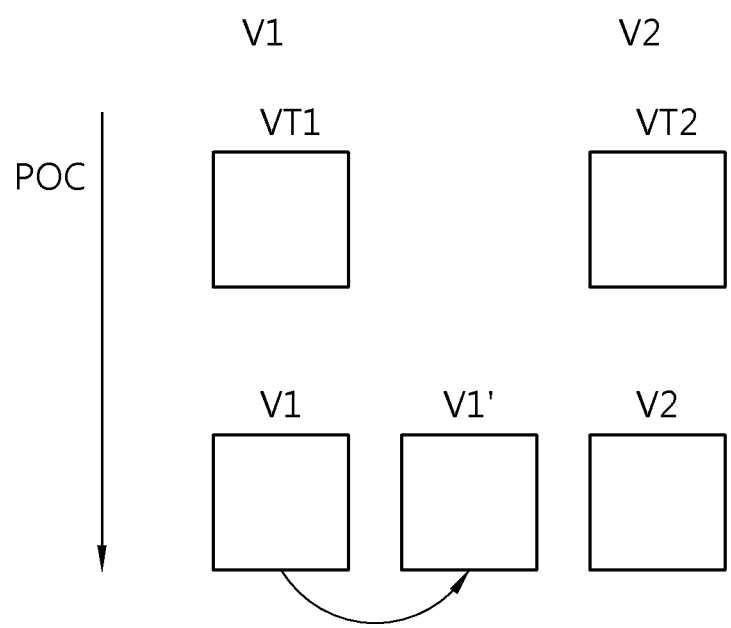
FIG. 1 is a diagram schematically illustrating an example of video information for processing a 3D video.

The invention may be variously modified in various forms and may have various embodiments, and specific embodiments thereof will be illustrated in the drawings and described in detail. However, these embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as "include" and "have" in this description are intended for indicating that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience of explanation on different specific functions in a video encoder and a video decoder, and do not mean that the elements are embodied by independent hardware or independent software. For example, two or more elements out of the elements may be combined to form a single element, or one element may be split into plural elements. Embodiments in which the elements are combined and/or split belong to the scope of the invention without departing from the concept of the invention.

In encoding/decoding for reproducing a 3D video on a display device, a video input to a video encoder may include a texture video and a depth map. The depth map means a video representing a distance from a viewpoint to the surface of an object in the video. Here, the viewpoint may be camera imaging the video. The depth map (depth video) may be generated by a camera imaging a depth.

The texture video means a video constituting a 3D video and including information (for example, color and brightness) other than depth information. The texture video may include multi-view videos.

In order to process a 3D video, depth maps (depth picture) and texture pictures may be processed in the encoding/decoding process to be described later, and the texture pictures may be processed by views. At this time, the texture pictures may be referred to for processing a depth map and the depth maps may be referred to for processing a texture picture. The texture picture may be processed with reference to another view video.

FIG. 1 is a diagram schematically illustrating an example of video information used to process a 3D video.

In order to process a 3D video, a multi-view video is processed as described above. In FIG. 1, video processing using two views V1 and V2 is illustrated for the purpose of convenience of explanation.

Referring to FIG. 1, a texture picture VT1 and a depth map DV1 of view 1 V1 and a texture picture VT2 and a depth map DV2 of view 2 V2 may be present in the same picture order count (POC). The POC represents a picture output order. Pictures having the same POC can be said to have the same picture output order.

A depth map VD1' of a view other than view 1 may be generated through warping using additional information such as camera parameters and depth information on the basis of the depth map DV1 of view 1 V1.

Figure 2:
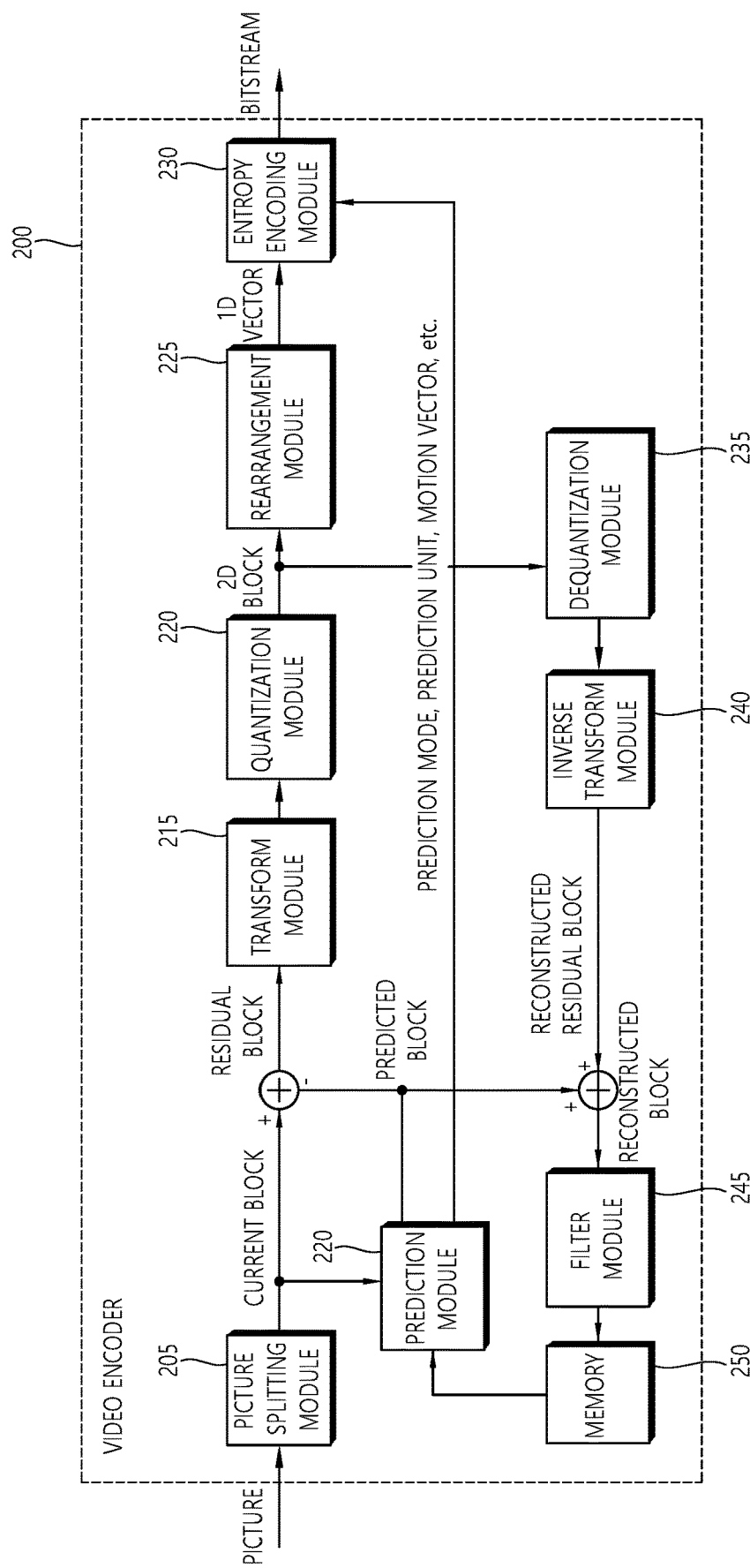
FIG. 2 is a block diagram schematically illustrating a video encoder according to an embodiment of the present invention.

FIG. 2 is a block diagram schematically illustrating a video encoder according to an embodiment of the present invention. Referring to FIG. 1, a video encoder 100 includes a picture splitting module 205, a prediction module 210, a transform module 215, a quantization module 220, a rearrangement module 225, an entropy encoding module 230, a dequantization module 235, an inverse transform module 240, a filter module 245, and a memory 250.

The picture splitting module 205 may split an input picture into at least one process unit. Here, a block as the process unit may be a prediction unit (hereinafter, referred to as a PU), a transform unit (hereinafter, referred to as a TU), or a coding unit (hereinafter, referred to as a CU).

The prediction module 210 performs a prediction process on the process units of the picture split by the picture splitting module 205 to construct a predicted block. The process unit of a picture in the prediction module 210 may be a CU, a TU, or a PU. The prediction module 210 may determine a prediction method used for the corresponding process unit and may determine specific details (for example, a prediction mode) of the determined prediction methods.

The prediction module 210 may use any one of intra prediction, inter prediction, and inter-view prediction as the prediction method.

The prediction module 210 may perform a prediction process on the basis of information of at least one picture of a picture previous to and/or subsequent to a current picture to construct a predicted block in the inter prediction. The prediction module 210 may perform a prediction process on the basis of pixel information of a current picture to construct a predicted block in the intra prediction. The prediction module 210 may construct a predicted block with reference to pictures of different views in the inter-view prediction.

A skip mode, a merge mode, a motion vector prediction mode, and the like may be used in the inter prediction method. In the inter prediction, a reference picture may be selected for a PU and the reference block having the same size as the PU may be selected. The prediction module 210 constructs residual signals of the current block and a predicted block of which a motion vector is minimized.

Information such as an index of a reference picture selected in the inter prediction, a motion vector predictor, and residual signals is entropy-encoded and is transmitted to a video decoder. When the skip mode is used, a predicted block may be used as a reconstructed block without using a residual block. Accordingly, the residual block may not be constructed, transformed, quantized, and transmitted.

When the intra prediction is performed, the prediction mode may be determined in the unit of PUs and the prediction may be performed in the unit of PUs. The prediction mode may be determined in the unit of PUs and the intra prediction may be performed in the unit of TUs.

The prediction modes in the intra prediction may include 33 directional prediction modes and at least two non-directional modes. The non-directional modes may include a DC prediction mode and a planar mode.

In the intra prediction, a predicted block may be constructed after a filter is applied to reference samples. At this time, it may be determined whether a filter should be applied to reference samples, depending on the intra prediction mode of a current block and/or the size of the current block.

In the inter-view prediction, the prediction module 210 may perform a prediction process on a current block using a global disparity vector (GDV) specifying a position of a corresponding block, which can be referred to for prediction of a current block in a current view, in a reference view to construct a predicted block. The prediction module 210 may perform an inter-view prediction process on the current block using the skip mode similarly to the inter prediction or using a MVP on the basis of motion information of the corresponding block.

A PU may be a block having various sizes/shapes. For example, the PU may be a 2N×2N block, a 2N×N block, an N×2N block, or an N×N block (where N is an integer). In addition to the above-mentioned sizes, PUs such as an N×mN block, an mN×N block, a 2N×mN block, and an mN×2N block (where m<1) may be additionally defined and used.

Residual values (a residual block or a residual signal) between the constructed predicted block and the original block may be input to the transform module 215. The prediction mode information, the motion vector information, the disparity vector, and the like used for the prediction may be encoded along with the residual values by the entropy encoding module 230 and may be transmitted to the video decoder.

The transform module 215 may perform a transform operation on the residual block in the unit of TUs and create transform coefficients.

The transform module 215 may perform the transform after down-sampling the texture picture and the depth map. The down-sampling may be performed on low-frequency areas in the texture picture and the depth picture and may be performed on areas of which detailed characteristics are not important. By this down-sampling, it is possible to reduce complexity and to enhance coding efficiency.

The unit of transform in the transform module 215 may be a TU and may have a quad tree structure. At this time, the size of the TU may be determined within a range including a predetermined largest size and a predetermined minimum size. The transform module 215 may transform the residual block using discrete cosine transform (DCT) and/or discrete sine transform (DST).

The quantization module 220 may quantize the residual values transformed by the transform module 215 and may create quantization coefficients. The values derived by the quantization module 220 may be supplied to the dequantization module 235 and the rearrangement module 225.

The rearrangement module 225 may rearrange the quantization coefficients supplied from the quantization module 220. By rearranging the quantization coefficients, it is possible to enhance the coding efficiency in the entropy encoding module 230. The rearrangement module 225 may rearrange the quantization coefficients in the form of a two-dimensional block to the form of a one-dimensional vector through the use of a coefficient scanning method. The rearrangement module 225 may enhance the entropy encoding efficiency in the entropy encoding module 230 by changing the order of coefficient scanning on the basis of stochastic statistics of the coefficients transmitted from the quantization module.

The entropy encoding module 230 may perform an entropy encoding process on the quantization coefficients rearranged by the rearrangement module 225. Entropy encoding methods such as an exponential Golomb method, a CAVLC (Context-Adaptive Variable Length Coding) method, and/or a CABAC (Context-Adaptive Binary Arithmetic Coding) method may be used for the entropy encoding. The entropy encoding module 230 may encode a variety of information such as quantization coefficient information, block type information, prediction mode information, partition unit information, transfer unit information, motion vector information, reference picture information, block interpolation information, and filtering information which are supplied from the rearrangement module 225 and the prediction module 210.

The entropy encoding module 230 may multiplex the picture information on the multiple views and the picture information on the depth map and may transmit the multiplexed information through the use of a bitstream.

The dequantization module 235 dequantizes the values quantized by the quantization module 220. The inverse transform module 240 inversely transforms the values dequantized by the dequantization module 235. When down-sampling is performed by the transform module 215, the inverse transform module 240 may perform up-sampling on the inversely-transformed residual block. The sampling rate of the up-sampling may be determined to correspond to the sampling rate of the down-sampling performed by the transform module 215.

The residual values created by the dequantization module 235 and the inverse transform module 240 and the predicted block predicted by the prediction module 210 may be added to construct a reconstructed block.

FIG. 2 illustrates that the residual block and the predicted block are added by an adder to construct a reconstructed block. Here, the adder may be considered as a particular module (reconstructed block constructing module) that constructs a reconstructed block.

The filter module 245 may apply at least one of a deblocking filter, an adaptive loop filter (ALF), and a sample adaptive offset (SAO) to the reconstructed picture.

The deblocking filter may remove a block distortion generated at the boundary between blocks in the reconstructed picture. The ALF may perform a filtering process on the basis of the resultant values of comparison of the original picture with the reconstructed picture of which the blocks have been filtered by the deblocking filter. The ALF may be applied only when high efficiency is necessary. The SAO may reconstruct an offset difference of the residual block, which has been subjected to the deblocking filter, from the original picture in the unit of pixels and may be applied in the form of a band offset and an edge offset.

The memory 250 may store the reconstructed block or picture derived by the filter module 245. The reconstructed block or picture stored in the memory 250 may be supplied to the prediction module 210 that performs the inter prediction.

Figure 3:
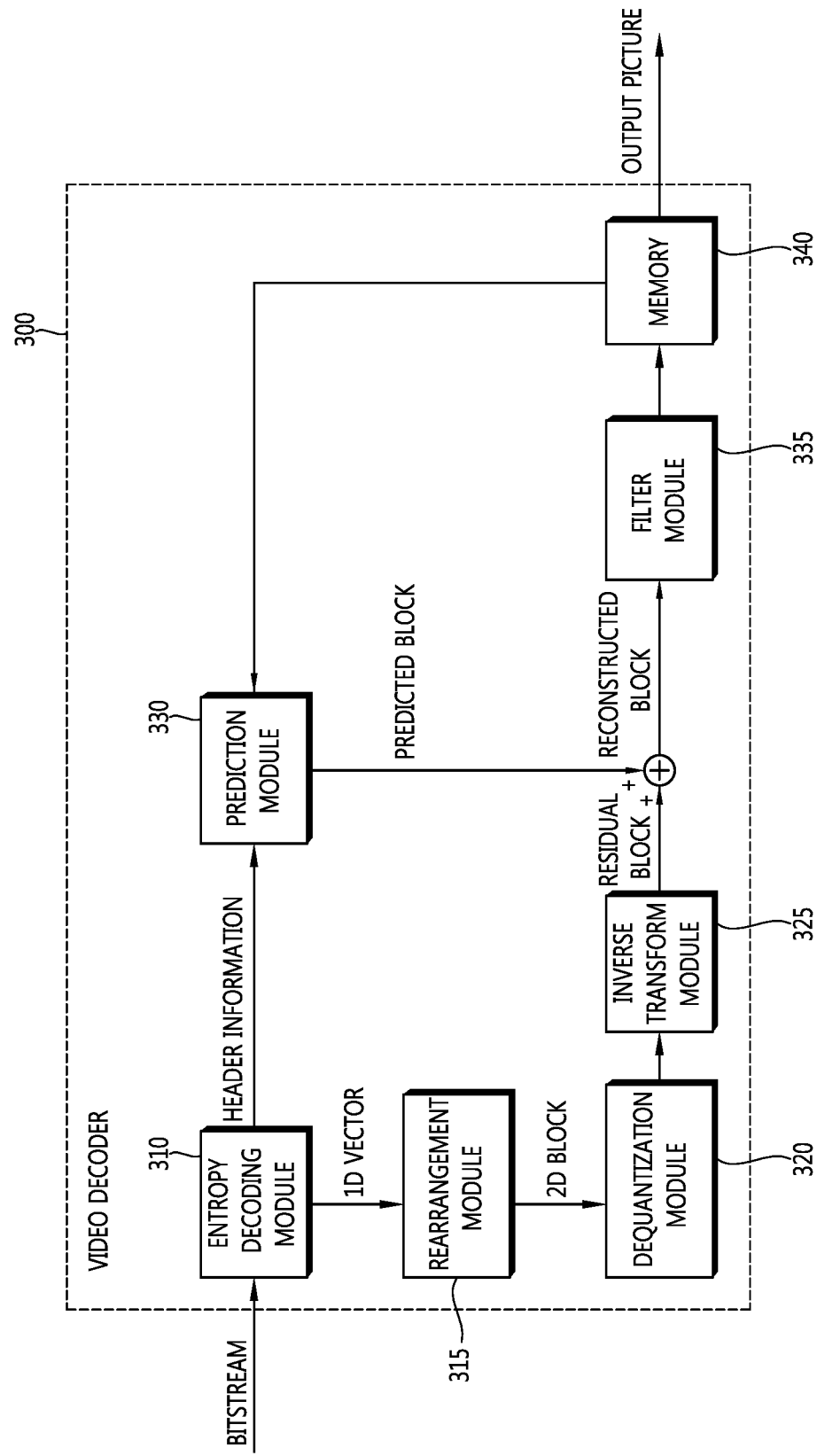
FIG. 3 is a block diagram schematically illustrating a video decoder according to an embodiment of the present invention.

FIG. 3 is a block diagram schematically illustrating a video decoder according to an embodiment of the present invention. Referring to FIG. 3, a video decoder 300 may include an entropy decoding module 310, a rearrangement module 315, a dequantization module 320, an inverse transform module 325, a prediction module 330, a filter module 335, and a memory 340.

When a video bitstream is input from the video encoder, the input bitstream may be decoded on the basis of the order in which video information is processed by the video encoder.

For example, when the video encoder uses a variable length coding (hereinafter, referred to as "VLC") method such as the CAVLC method to perform the entropy encoding operation, the entropy decoding module 310 may implement the same VLC table as the VLC table used in the video encoder and may perform the entropy decoding operation. When the video encoder uses the CABAC method to perform the entropy encoding process, the entropy decoding module 310 may perform the entropy decoding operation using the CABAC method to correspond thereto.

When the bitstream received from the video encoder is obtained by multiplexing picture information on the multi-views and picture information on the depth map, the entropy decoding module 310 may perform the entropy decoding operation after de-multiplexing the received bitstream.

Information for constructing a predicted block out of the information decoded by the entropy decoding module 310 may be supplied to the prediction module 330, and the residual values entropy-decoded by the entropy decoding module 310 may be input to the rearrangement module 315.

The rearrangement module 315 may rearrange the bitstream entropy-decoded by the entropy decoding module 310 on the basis of the rearrangement method in the video encoder. The rearrangement module 315 may reconstruct and rearrange coefficients expressed in the form of a one-dimensional vector into coefficients in the form of a two-dimensional block. The rearrangement module 315 may be supplied with information associated with the coefficient scanning performed by the video encoder and may perform the rearrangement using a method of inversely scanning the coefficients on the basis of the scanning order in which the scanning is performed by the video encoder.

The dequantization module 320 may perform dequantization on the basis of the quantization parameters supplied from the video encoder and the coefficient values of the rearranged block.

The inverse transform module 325 may perform the inverse DCT and/or inverse DST of the DCT and/or DST, which has been performed by the transform module of the video encoder, on the quantization result from the video encoder. The inverse transform may be performed on the basis of the transfer unit or the partition unit of a picture determined by the video encoder. The transform module of the video encoder may selectively perform the DCT and/or DST depending on plural information pieces such as the prediction method, the size of a current block, and the prediction direction, and the inverse transform module 325 of the video decoder may perform the inverse transform on the basis of the transform information on the transform performed by the transform module of the video encoder.

When the transform is performed on the residual block after the down-sampling is performed thereon by the video encoder, the inverse transform module 325 may perform the up-sampling on the inversely-transformed residual block to correspond to the down sampling performed by the video encoder.

The prediction module 330 may construct a predicted block on the basis of prediction block construction information supplied from the entropy decoding module 310 and the previously-decoded block and/or picture information supplied from the memory 340.

When the prediction mode of a current block is an intra prediction mode, the prediction module 330 may perform an intra prediction operation of constructing a predicted block on the basis of pixel information of a current picture to construct a predicted block.

When the prediction mode of a current block is the inter prediction mode, the prediction module 330 may perform the inter prediction operation on the current block on the basis of information included in at least one of a previous picture and a subsequent picture of the current picture. At this time, motion information for the inter prediction of the current block, for example, information on motion vectors and reference picture indices, supplied from the video encoder may be derived on the basis of a skip flag, a merge flag, and the like received from the video encoder.

When the inter-view prediction is performed on the current block, the prediction module 330 may perform a prediction operation on the current block using reference pictures in another view to construct a predicted block.

The reconstructed block may be constructed using the predicted block constructed by the prediction module 330 and the residual block supplied from the inverse transform module 325. FIG. 3 illustrates that the residual block and the predicted block are added by an adder to construct a reconstructed block. Here, the adder may be considered as a particular module (reconstructed block constructing module) that constructs a reconstructed block.

When the skip mode is used, the residual signal may not be transmitted and the predicted block may be used as a reconstructed block.

The reconstructed block and/or picture may be supplied to the filter module 335. The filter module 235 may perform a deblocking filtering operation, an SAO operation, and/or an ALF operation on the reconstructed block and/or picture.

The memory 340 may store the reconstructed picture or block for use as a reference picture or a reference block and may supply the reconstructed picture to an output module. Although not illustrated, an output module may provide a 3DV video using the reconstructed multi-view pictures.

A multi-view video sequence imaged with plural cameras is used in encoding/decoding a 3D video. A difference of global disparity is present between videos imaged from different viewpoints. The global disparity may be mentioned as a difference of global disparity present between a picture at a specific time in a current view and a picture at the same time in another view. Here, the global disparity difference between two views may be expressed by a global disparity vector (hereinafter, referred to as a "GDV").

Figure 4:
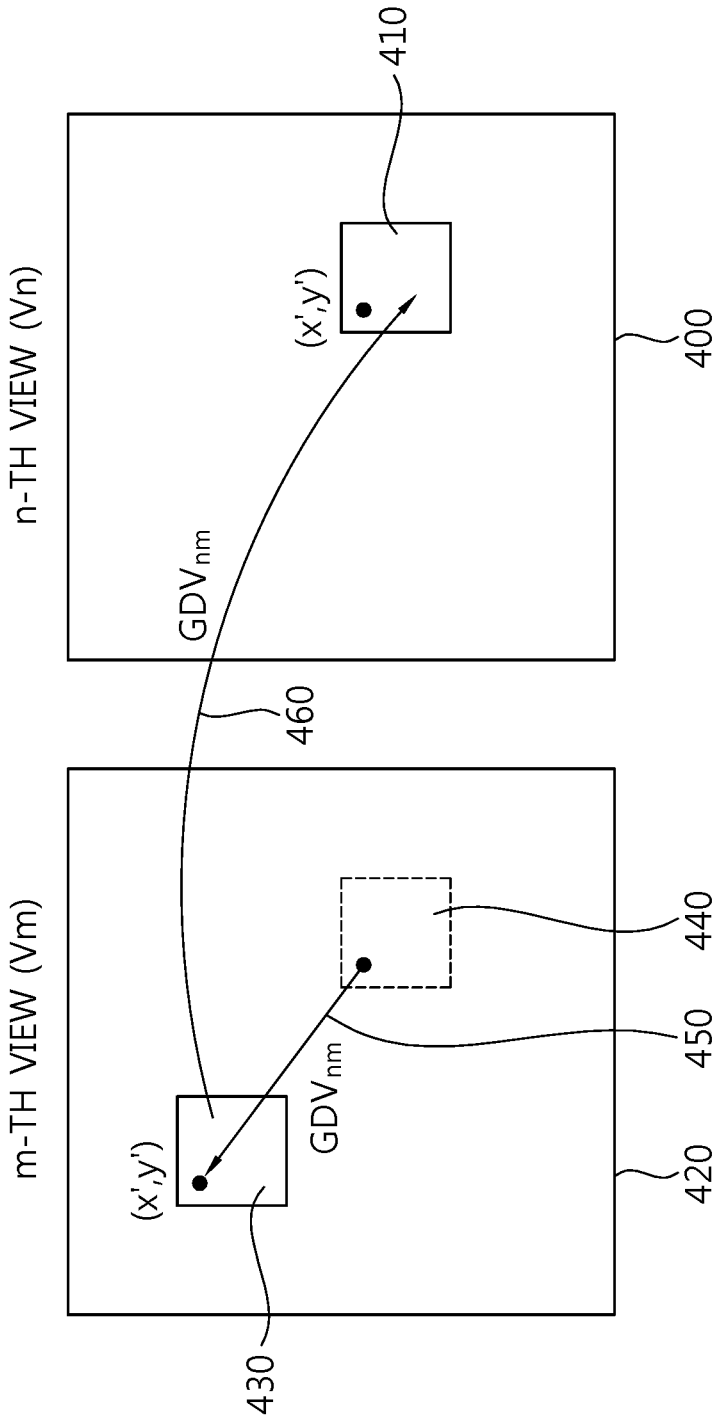
FIG. 4 is a diagram schematically illustrating a method of performing inter-view prediction using a GDV in the course of encoding/decoding a 3D video.

FIG. 4 is a diagram schematically illustrating a method of performing inter-view prediction using a GDV in encoding/decoding a 3D video. In FIG. 4, texture pictures in the views are illustrated for the purpose of convenience of explanation.

In FIG. 4, for example, the inter-view prediction is performed on a current block 410 of a picture 400 in the n-th view Vn out of the multi-views.

Referring to FIG. 4, motion information of a reference block 430 of a picture 420 in the m-th view Vm out of the multi-views may be referred to for the inter-view prediction of the current block 410. The picture 400 in the n-th view and the picture 420 in the m-th view are pictures at the same time, that is, pictures having the same picture order count (POC). The POC is information indicating a picture output order.

The relationship between the current block 410 and the reference block 430 belonging to different views may be defined by a GDVnm 450. In consideration of the relationship between a block obtained by projecting the current block 410 to the m-th view and the reference block 430, the relationship between the top-left pixel (x, y) of the current block 410 in the n-th view and the top-left pixel (x', y') of the reference block 430 in the m-th view may be expressed by Expression 1.

$$(x',y')=GDVnm+(x,y)$$

$$GDVnm=(dvx_{nm},dvy_{nm}) \qquad \text{<Expression 1>}$$

The current block 410 in the n-th view may be predicted (460) using the reference block 430 in the m-th view specified by the GDV derived by Expression 1 as a reference block.

The video encoder may select disparity minimizing an error between two pictures of the same POC in different views as the global disparity between the corresponding views. For example, the disparity having the optimal sum of absolute differences (SAD) between two views may be determined by blocks. Here, an mean square error (MSE), a mean absolute vector (MAD), or the like may be used instead of the SAD.

The GDV is expressed as a vector representing the selected global disparity.

The video encoder may transmit information of the derived GDV through the use of a bitstream so as to enable the video decoder to use the same GDV.

When the inter-view prediction is performed using the GDV, motion information of a block (reference block) of a reference picture in a reference view corresponding to the current block of the current view may be acquired and used for prediction of the current block using the GDV. For example, the motion information (for example, a motion vector) of the reference block may be copied and used as a temporal motion vector of the current block or a motion vector predictor of the current block.

Texture pictures are illustrated in FIG. 4, but the present invention is not limited to the texture pictures. The details described with reference to FIG. 4 may be similarly applied to depth maps or a depth map and a texture picture.

Figure 5:
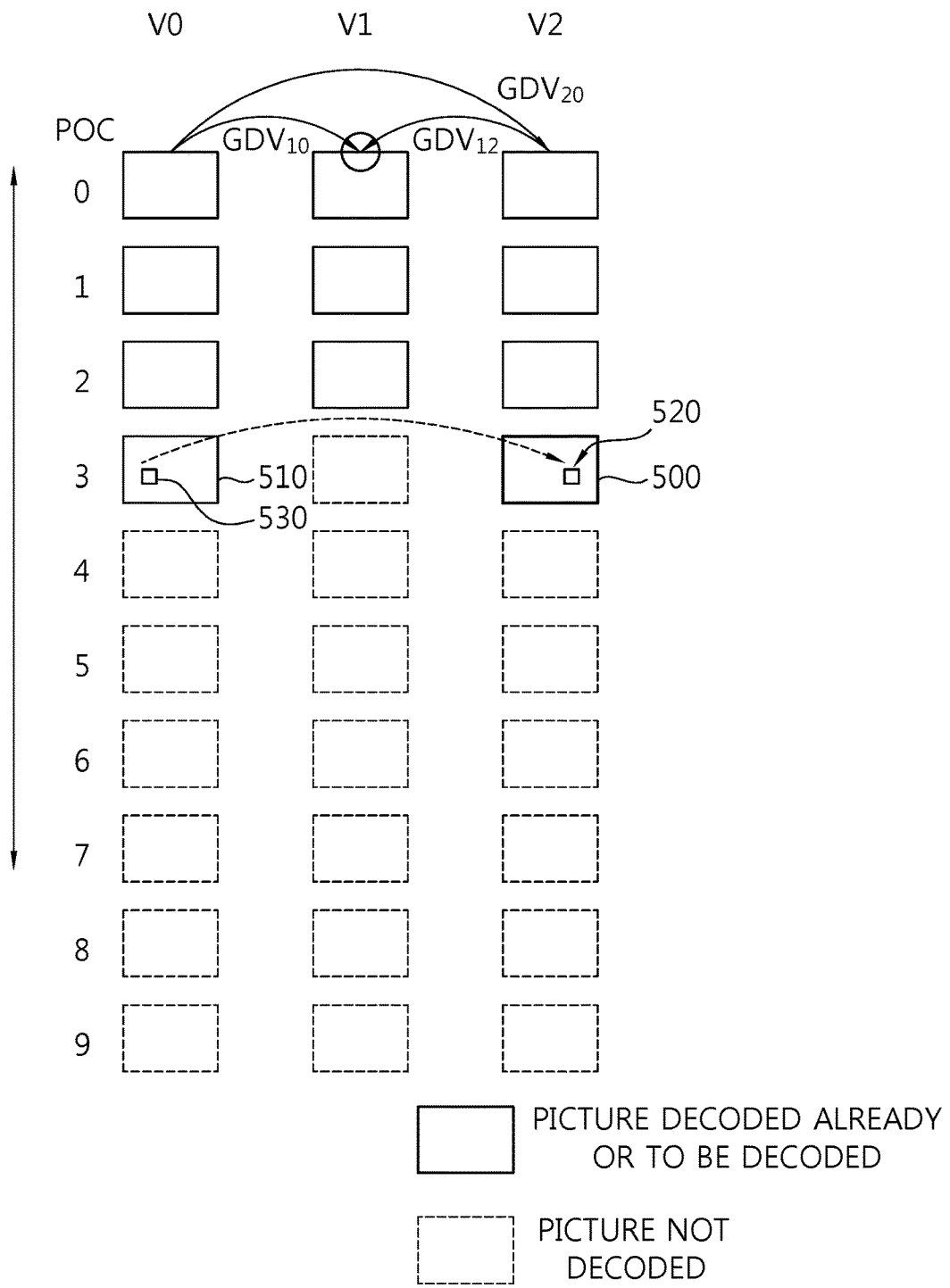
FIG. 5 is a diagram schematically illustrating an example where a multi-view video is decoded.

FIG. 5 is a diagram schematically illustrating an example where a multi-view video is decoded. In the example illustrated in FIG. 5, videos of three views V0, V1, and V2 are decoded, pictures in the respective views form a sequence depending on the POC, and eight continuous pictures in the POC order form a group of pictures (GOP). In FIG. 5, texture pictures are illustrated for the purpose of explanation.

In FIG. 5, $GDV_{10}$ is a GDV used to predict a current block in view V1 using view V0 as a reference view, $GDV_{12}$ is a GDV used to predict a current block in view V1 using view V2 as a reference view, and $GDV_{20}$ is a GDV used to predict a current block in view V2 using view V0 as a reference view. The GDV indicates a correlation between two blocks among pictures of the same time point (that is, the same POC) in two different views.

The GDVs may be transmitted through the use of a bitstream from the video encoder as described above. The video decoder may decode and use the GDVs from the bitstream.

Referring to FIG. 5, a prediction operation is performed on a current block 520 of a current picture 500 in view V2 with reference to a block 530 (reference block) of a reference picture 510 in view V0. The current picture 500 and the reference picture 510 have the same POC (POC=2). As described above, $GDV_{20}=(dvx_{20}, dvy_{20})$ is a GDV for specifying the position of the reference block in the reference view V0 at the time of decoding the current view V2.

Referring to Expression 1, when the top-left position of the current block in the current picture 500 in view V0 is (x, y), the top-left position (x', y') of the corresponding block 430 (reference block) in the reference picture 510 in view V2 (reference view) may be specified by Expression 2.

$$(x',y')=(x,y)+GDV_{20} \qquad \text{<Expression 2>}$$

The video encoder and the video decoder perform a prediction operation on the current block with reference to motion information of a block in a reference view determined by the GDV in the inter-view prediction. For example, in the example illustrated in FIG. 5, the video encoder and the video decoder may copy the motion information from the reference block 530 at the position (x', y') specified by $GDV_{20}$ and may use the copied motion information as a temporal motion vector of the current block 520 or may use the copied motion information as a motion vector predictor of the current block 520.

The texture pictures are described with reference to FIG. 5, but the present invention is not limited to the texture picture. The details described with reference to FIG. 5 may be similarly applied to depth maps or a depth map and a texture picture.

On the other hand, the pictures in the respective views constituting a multi-view video are obtained by imaging the same scene with plural cameras (for example, cameras arranged in parallel). Accordingly, the pictures in neighboring views have a high texture correlation and a high motion correlation.

In coding a multi-view video, the high texture correlation between neighboring views may be used to perform inter-view prediction. For example, in the inter-view prediction, the inter prediction may be performed using a picture in a neighboring view as a reference picture.

When the texture correlation with a neighboring view (reference view) is high at the time of performing the inter-view prediction, the motion information used for the inter prediction in the corresponding block in the reference view may be directly used for the current block in the current view. For example, the skip mode may be used for the inter-view prediction.

Figure 6:
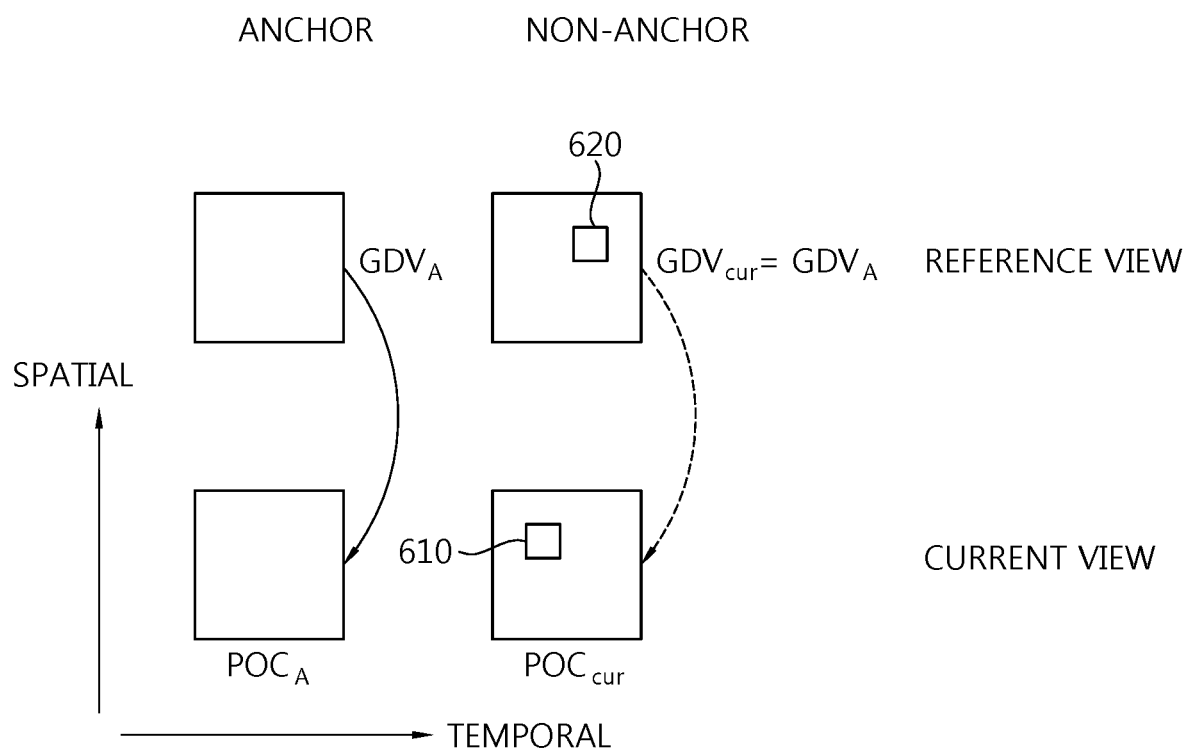
FIG. 6 is a diagram schematically illustrating an example where a skip mode is used for inter-view prediction.

FIG. 6 is a diagram schematically illustrating an example where the skip mode is used as an example of the inter-view prediction.

FIG. 6 illustrates an example where the skip mode is applied between two views (the reference view and the current view) subjected to the inter-view prediction for the purpose of convenience of explanation.

In the skip mode in the inter-view prediction, the high motion correlation between neighboring views is used. The motion information used for the inter prediction mode of the reference view may be used to the coding of the current view in the skip mode.

Referring to FIG. 6, the motion information of the current view is predicted on the basis of the motion information of the reference view at $POC_A$ of an anchor picture. At the current POC $POC_{cur}$ of a non-anchor picture, the current block 610 is subjected to the inter-view prediction on the basis of the GDV of the corresponding block 620 in the reference view. The GDV is used to derive the position of a block (corresponding block) corresponding to the current block in the reference picture of a neighboring view to be referred to. When the skip mode is used, the motion information used in the derived corresponding block is directly used to code the current block.

The anchor picture is a picture in which all slices in the same access unit are reference slices. Accordingly, the inter prediction is not performed on the anchor picture but the inter-view prediction is performed thereon. The pictures subsequent to the anchor picture in the POC order may be predicted using the inter-view prediction without using the inter prediction using information on the previously-coded pictures.

On the other hand, in the inter prediction, the current block may be predicted reusing the motion information of the neighboring blocks. Here, the neighboring blocks include spatial neighboring blocks of the current block in the current picture and a block (co-located block (Col block)) corresponding to the current block in another picture.

For example, in the merge mode and the skip mode, the motion information of one of the neighboring blocks is used as the motion information of the current block. In the skip mode, the video encoder may not transmit residual signals but may use the predicted signals created using the motion information of the neighboring blocks as reconstructed signals of the current block. When the MVP is used, the video encoder may transmit a difference value of a motion vector using any one of the motion vectors of the neighboring blocks as the motion vector predictor of the current block, and the video decoder may reconstruct the motion vector of the current block on the basis of the received difference value of the motion vector.

As described above, in the inter prediction, the motion information of the current block may be predicted reusing the motion information of the neighboring blocks.

Figure 7:
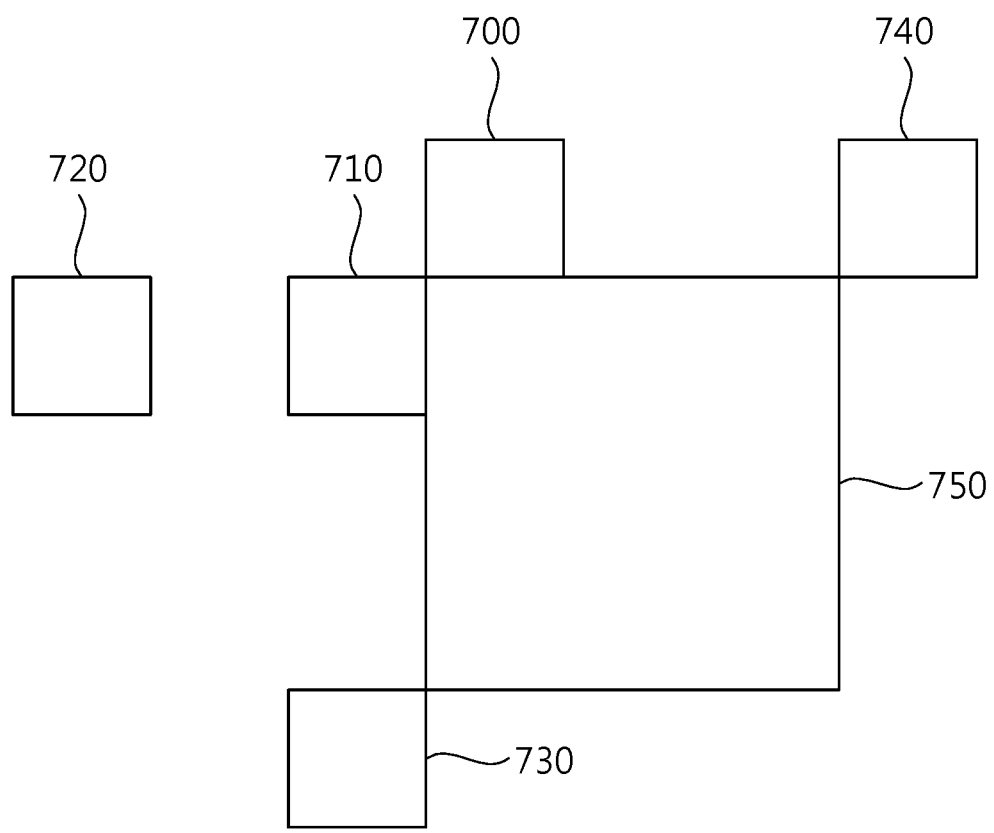
FIG. 7 is a diagram schematically illustrating an example of neighboring blocks available for predicting a current block in inter prediction using a merge mode.

FIG. 7 is a diagram schematically illustrating an example of neighboring blocks which can be used to predict the current block in the inter prediction using the merge mode.

Referring to FIG. 7, motion vector information of a top block 700, motion vector information of a left block 710, motion vector information of a co-located block (Col block) 720, motion vector information of a bottom-left corner block 730, and motion vector information of a top-upper corner block 740 out of the motion vector information of the neighboring blocks of the current block 750 may be used as motion vector predictor candidates of the current block.

The motion vector predictor may include the motion vector information used in the corresponding block, reference picture index information, and prediction direction information. The motion vector predictor includes motion vector information used in the corresponding block and the reference picture index to be used to predict the current picture may be determined and transmitted to the video decoder by the video encoder. On the other hand, as the reference picture index (for example, the reference picture index of the Col block) of the temporal merge candidates in the merge mode or the skip mode, a specific reference picture out of the candidate reference pictures in the reference picture list may be used regardless of the picture to be referred to by the Col block.

The video encoder may select the motion vector predictor of the current block out of the motion vector predictor candidates. For example, the video encoder may determine the motion information predictor of the current block in consideration of rate distortion optimization, compression efficiency, and the like. The video decoder may receive information indicating whether which motion information predictor to use from the video encoder and the prediction on the current block may be performed using the motion information predictor.

On the other hand, in the skip mode and the prediction mode using an MVP, the motion vector predictor candidates illustrated in FIG. 7 may be used in the same way as in the merge mode. When the MVP is used, a reference picture index may be separately transmitted to the video decoder from the video encoder.

Figure 8:
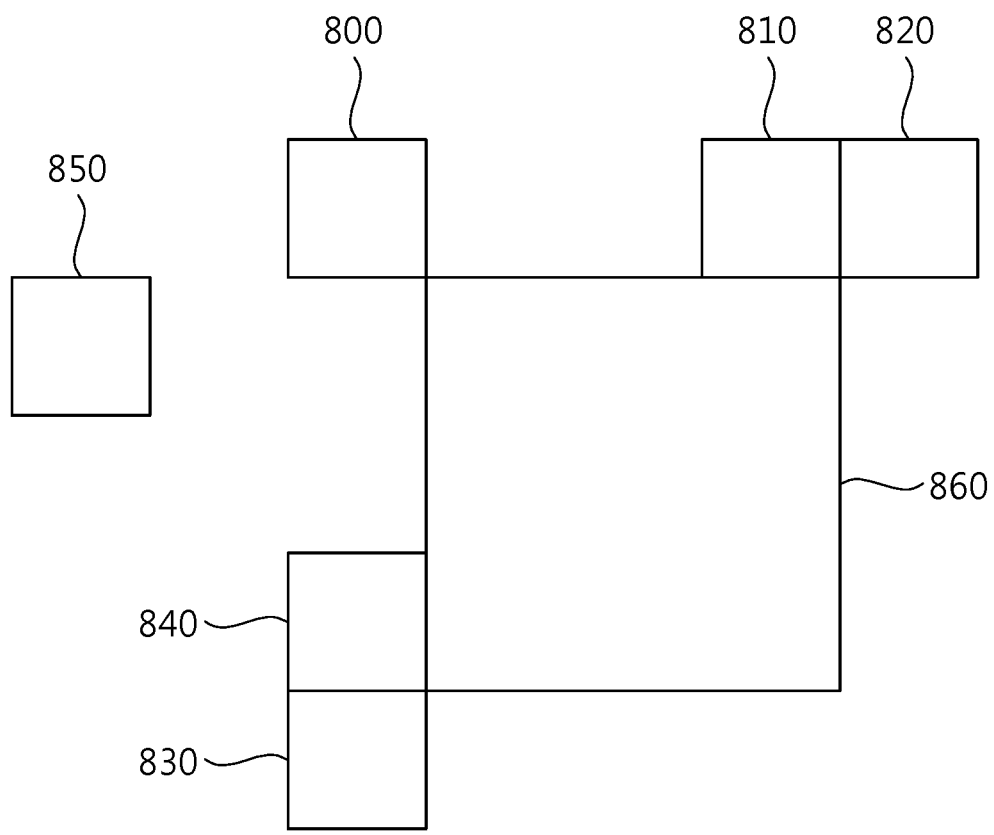
FIG. 8 is a diagram schematically illustrating another example of neighboring blocks available for predicting a current block in inter prediction.

FIG. 8 is a diagram schematically illustrating another example of neighboring blocks which can be used for prediction of the current block in the inter prediction.

the video encoder and the video decoder may perform prediction on the current block using the motion information of the neighboring blocks of the current block 860. Referring to FIG. 8, the motion information of one of a top-left block 800 of the current block 860, a top block 810 of the current block 860, a top-right corner block 820 of the current block, a bottom-left corner block 830 of the current block 860, a left block 840 of the current block 860, and a Col block 850 corresponding to the current block 860 in another picture may be used as the motion information predictor of the current block.

The video encoder may select the motion vector predictor of the current block out of the motion vector predictor candidates. For example, the video encoder may determine the motion information predictor of the current block in consideration of rate distortion optimization, compression efficiency, and the like. The video decoder may receive information indicating whether which motion information predictor to use from the video encoder and the prediction on the current block may be performed using the motion information predictor.

As described above, the motion vector predictor may include the motion vector applied to the corresponding block and the reference picture index. For example, in the merge mode or the skip mode, the motion vector and the reference picture index of the neighboring block as information of the selected motion vector predictor may be applied to the current block. When the MVP is used, the reference picture index may be transmitted from the video encoder to the video decoder. On the other hand, in the merge mode or the skip mode, as the reference picture indices (for example, the reference picture index of the Col block) of the temporal merge candidates, a specific reference picture out of the candidate reference pictures in the reference picture list may be used regardless of the pictures referred to by the Col block.

In the inter-view prediction, as in the examples illustrated in FIGS. 7 and 8, the prediction on the current block may be performed using the motion information of the neighboring blocks. When the motion information of the neighboring blocks is used for the inter-view prediction, the neighboring blocks include a block corresponding to the current block in another view.

Figure 9:
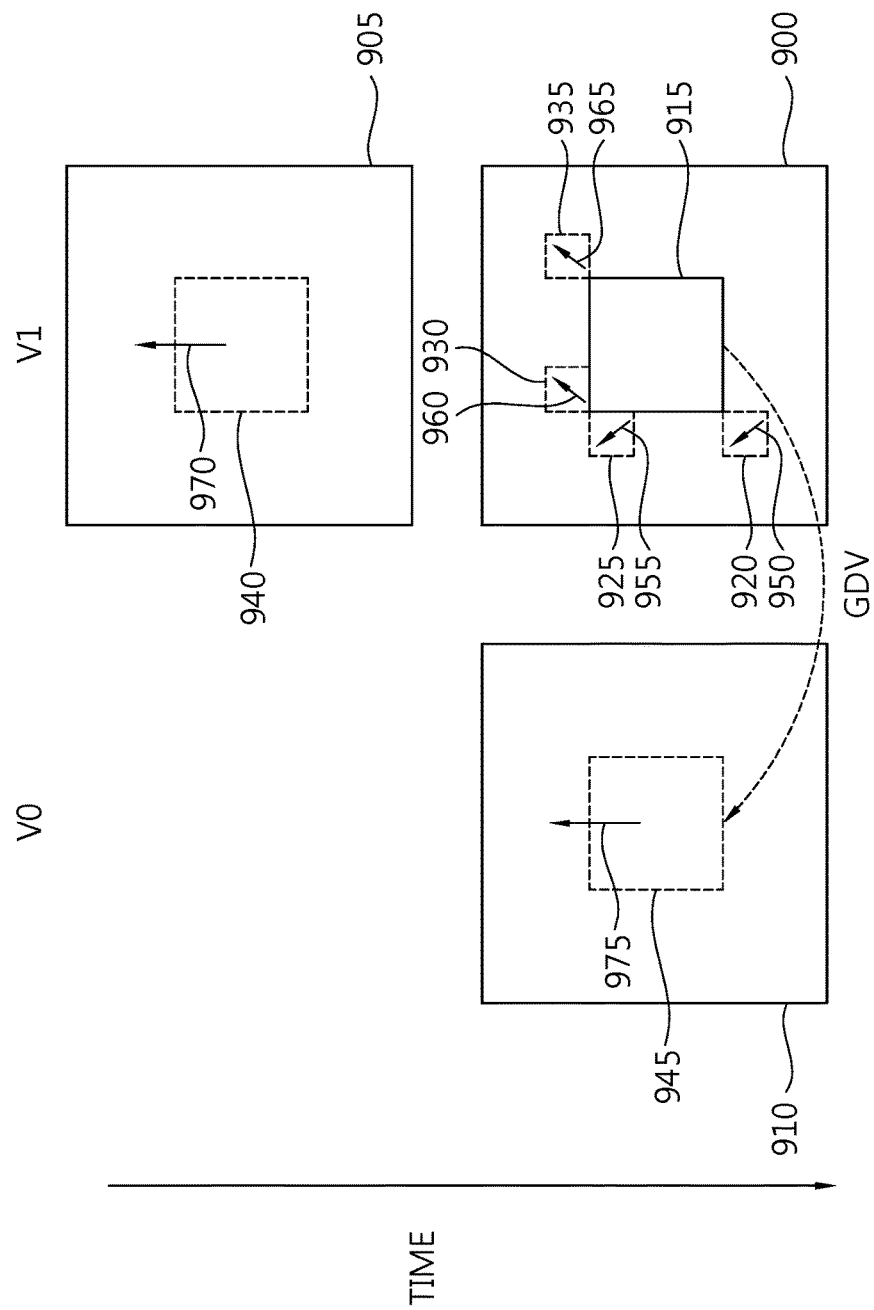
FIG. 9 is a diagram schematically illustrating an example of a motion vector predictor available for inter-view prediction.

FIG. 9 is a diagram schematically illustrating an example of a motion vector predictor which can be used for the inter-view prediction.

FIG. 9 illustrates an example where the information of a reference view V0 can be used to predict the current view V1. In FIG. 9, as in the example illustrated in FIG. 7, the inter prediction may be performed on the current block 915 using motion information (predictors) of a top block 930 of the current block 915, a top-right corner block 935 of the current block 915, a left block 925 of the current block 915, and a bottom-left corner block 920 of the current block 915 which are spatial neighboring blocks in the current picture 900. That is, the video encoder/video decoder may perform the inter prediction on the current block 915 using motion information 960 of the top block 930 of the current block 915, motion information 965 of the top-right corner block 935 of the current block 915, motion information 955 of the left block 925 of the current block 915, and motion information 950 of the bottom-left corner block 920 of the current block 915 as the motion vector predictor candidates.

A Col block 940 corresponding to the current block 915 in another picture 905 in the current view V1 may be used as the neighboring block of the current block 915. The video encoder/decoder may perform the inter prediction on the current block 915 using motion information 970 of the Col block 940 as the motion vector predictor candidate.

In addition, a reference block 945 corresponding to the current block 915 in a picture (reference picture) 910 of the same POC as the current picture 900 out of the pictures in another view (reference view) V0 may be used as the neighboring block of the current block. The video encoder/decoder may perform the inter prediction on the current block 915 using motion information 975 of the reference block 945 as the motion vector predictor candidate.

The video encoder may determine which motion vector predictor to use to predict the current block 915 out of the motion vector predictor candidates and may transmit information on the determined motion vector predictor to the video decoder. The video decoder may derive the motion vector predictor to be used to predict the current block 915 on the basis of the information transmitted from the video encoder.

As described above, in the example illustrated in FIG. 9, the prediction on the current block may be performed by adding the predictor for the inter-view prediction to the motion information predictor candidates of the current block 915. For example, in such a way of adding the motion vector predictor (inter-view motion vector predictor) for the inter-view prediction to the motion vector predictor candidates illustrated in FIG. 7 and applying the motion vector predictor candidates to the inter predictor modes such as the skip mode.

The motion vector predictor 975 used for the inter-view prediction may include at least one of the motion vector, the reference picture index refIdx, the inter prediction direction as the motion information of the corresponding block 945 searched for using the GDV as illustrated in the drawing.

The motion vector predictor 975 may be applied to the prediction modes (the skip mode, the merge mode, and the prediction mode using the MVP) for the inter-view prediction and the inter prediction, and the motion vector predictor for the inter-view prediction may not be defined or may not be used when the block 945 of the reference view V0 determined to be the corresponding block using the GDV is not a block subjected to the inter prediction.

Figure 10:
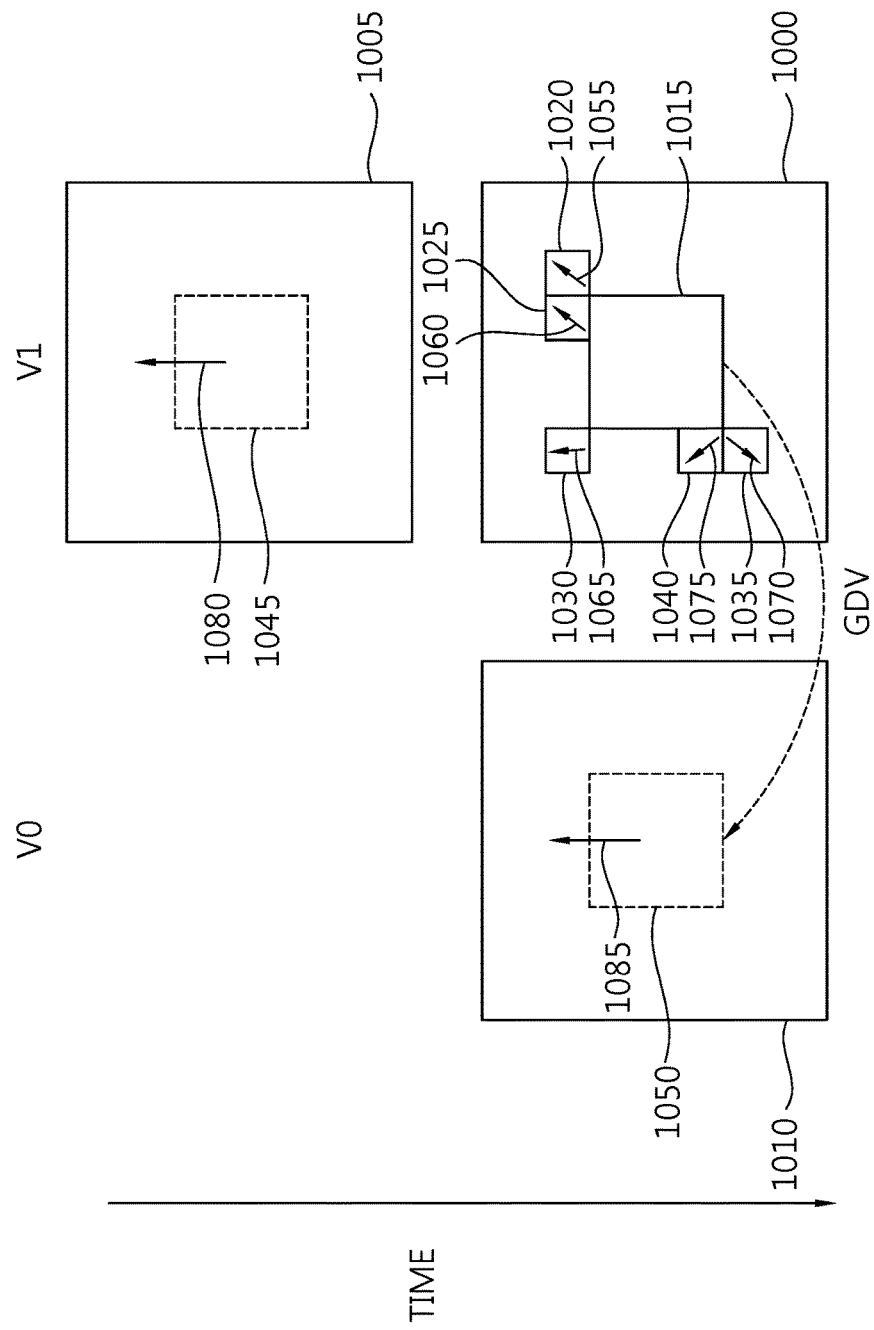
FIG. 10 is a diagram schematically illustrating another example of a motion vector predictor available in inter-view prediction.

FIG. 10 is a diagram schematically illustrating another example of a motion vector predictor which can be used for the inter-view prediction.

FIG. 10 illustrates an example where the information of the reference view V0 can be used to predict the current view V1. In FIG. 10, as in the example illustrated in FIG. 8, the inter prediction may be performed on the current block 1015 using motion information (predictors) of a top-right corner block 1020 of the current block 1015, a top block 1025 of the current block 1015, a top-left corner block 1030 of the current block 1015, a bottom-left corner block 1035 of the current block 1015, and a left block 1040 of the current block 1015 which are spatial neighboring blocks in the current picture 1000. That is, the video encoder/video decoder may perform the inter prediction on the current block 915 using motion information 1055 of the top-right corner block 1020 of the current block 1015, motion information 1060 of the top block 1025 of the current block 1015, motion information 1065 of the top-left corner block 1030 of the current block 1015, motion information 1070 of the bottom-left corner block 1035 of the current block 1015, and motion information 1075 of the left block 1040 of the current block 1015 as the motion vector predictor candidates.

A Col block 1045 corresponding to the current block 1015 in another picture 1005 in the current view V1 may be used as the neighboring block of the current block 1015. The video encoder/decoder may perform the inter prediction on the current block 1015 using motion information 1080 of the Col block 1045 as the motion vector predictor candidate.

In addition, a reference block 1050 corresponding to the current block 1015 in a picture (reference picture) 1010 of the same POC as the current picture 1000 out of the pictures in another view (reference view) V0 may be used as the neighboring block of the current block. The video encoder/decoder may perform the inter prediction on the current block 1015 using motion information 1080 of the reference block 1050 as the motion vector predictor candidate.

The video encoder may determine which motion vector predictor to use to predict the current block 1015 out of the motion vector predictor candidates and may transmit information on the determined motion vector predictor to the video decoder. The video decoder may derive the motion vector predictor to be used to predict the current block 915 on the basis of the information transmitted from the video encoder.

As described above, in the example illustrated in FIG. 10, the prediction on the current block may be performed by adding the predictor for the inter-view prediction to the motion information predictor candidates of the current block 1015. For example, in such a way of adding the motion vector predictor (inter-view motion vector predictor) for the inter-view prediction to the motion vector predictor candidates illustrated in FIG. 8 and applying the motion vector predictor candidates to the inter predictor modes such as the skip mode.

The motion vector predictor 1085 used for the inter-view prediction may include at least one of the motion vector, the reference picture index refIdx, the inter prediction direction as the motion information of the corresponding block 1050 searched for using the GDV as illustrated in the drawing.

The motion vector predictor 1085 may be applied to the prediction modes (the skip mode, the merge mode, and the prediction mode using the MVP) for the inter-view prediction and the inter prediction, and the motion vector predictor for the inter-view prediction may not be defined or may not be used when the block 1050 of the reference view V0 determined to be the corresponding block using the GDV is not a block subjected to the inter prediction.

When the skip mode or the merge mode is used, the motion vector predictors 1055, 1060, 1065, 1070, 1075, 1080, and 1085 may include information indicating a reference picture to be used to predict the current block in addition to the motion vectors. Alternatively, when the MVP is used, the motion vector predictors 1055, 1060, 1065, 1070, 1075, 1080, and 1085 may include information on the motion vectors and the information indicating the reference picture of the current block may be separately transmitted to the video encoder.

As described above, the prediction on a corresponding block (current block) in the current view may be performed reusing the motion information of a block (a corresponding block or a reference block) in another view (reference view) corresponding to the current block in the inter-view prediction.

The video encoder may transmit necessary information through the use of the slice header for this purpose. The video decoder may perform the inter-view prediction on the current block on the basis of the received information.

Table 1 schematically shows an example of information to be transmitted through the use of the slice header.

TABLE 1

```
slice_header ( ) {
    inter_view_motion_reuse_info_flag
    if(inter_view_motion_reuse_info_flag ) {
        inter_view_motion_reuse_dir
        global_disparity_vector_x
        global_disparity_vector_y
    }
}
```

Referring to Table 1, the video encoder transmits the necessary information for the inter-view prediction through the use of the slice header. The video decoder may acquire the necessary information for the inter-view prediction from the slice header by parsing or entropy-decoding the received bitstream, and may perform the inter-view prediction on the basis thereof.

Here, inter_view_motion_reuse_info_flag indicates whether the information on reuse of the motion information (for example, the motion vector) is transmitted through the use of the current slice corresponding to the slice header in the inter-view prediction. For example, the information on reuse of the motion information (for example, the motion vector) includes information indicating whether to reuse the motion information. The reuse of the motion information includes predicting the current block using the motion information of the neighboring blocks of the current block and the neighboring blocks of the current block include a block corresponding to the current block in another view.

inter_view_motion_reuse_dir specifies a view which is referred to by the current view when the motion information is reused in the inter-view prediction (when the motion information of the neighboring blocks is used). For example, a view in a first direction may be referred to when the value of inter_view_motion_reuse_dir is 0, and a view in a second direction may be referred to when the value of inter_view_motion_reuse_dir is 1. For example, when views of the multi-view are arranged along the viewpoints, the direction from the right view to the left view is defined as a direction L0, and the direction from the left view to the right view is defined as a direction L1.

Figure 11:
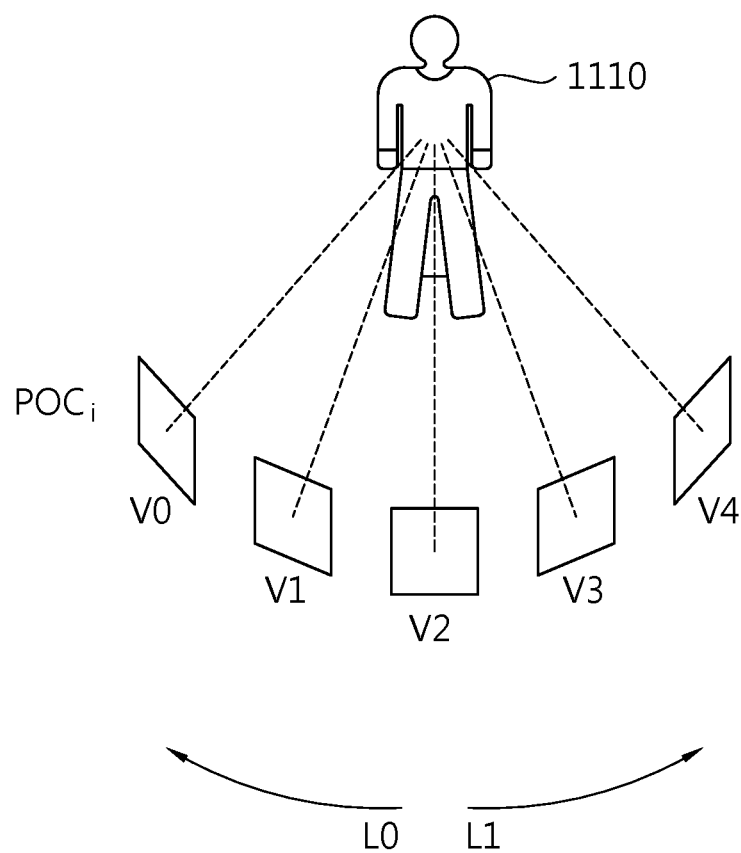
FIG. 11 is a diagram schematically illustrating directions of reference views.

FIG. 11 is a diagram schematically illustrating the directions of the reference views. FIG. 11 illustrates an example where five views V0 to V4 in which the same object 1110 is imaged at the same time point (POCi) are present. Here, the example where five views are present is described, but the present invention is not limited to this example and the number of views may be less than five or more than five.

Referring to FIG. 11, when the inter-view prediction is applied to the views, the direction in which another view on the left side is referred to is defined as the direction L0 and the direction in which another view on the right side is referred to is defined as the direction L1.

Accordingly, in FIG. 11, it is assumed that the view ID of the current view is 1, a view with a view ID of 0 is referred to in the direction L0, and a view with a view ID of 2 is referred to in the direction L1. When the value of inter_view_motion_reuse_dir is 0, the motion information of the view with a view ID of 0 may be used. When the value of inter_view_motion_reuse_dir is 1, the motion information of the view with a view ID of 2 may be used.

global_disparity_vector_x and global_disparity_vector_y specify the position of a block of which the motion information is referred to in the reference picture (for example, a picture having the same POC as the current picture) in the reference view on the basis of the position of the current block (for example, a TU, a PU, or a CU to be decoded). In other words, global_disparity_vector_x and global_disparity_vector_y specify the x component and the y component of the GDV for the current block. The GDV for the current block represents a difference between the position corresponding to the position of the current block and the position of the reference block in the reference picture (or a difference between the position of the current block and the position of the reference block in the current picture). The values of global_disparity_vector_x and global_disparity_vector_y, that is, the values of the GDV, may be defined in the unit of predetermined pixels, for example, 4 pixels, 8 pixels, or 16 pixels.

On the other hand, when the background and the foreground in a picture have different motions, it is more efficient to define plural GDVs for areas in the current picture than to define one GDV for each reference picture.

Figure 12:
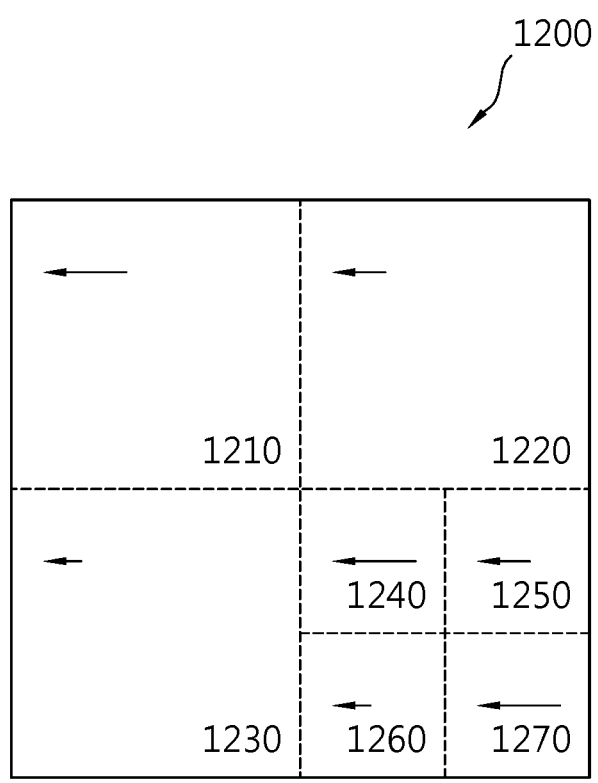
FIG. 12 is a diagram schematically illustrating an example of a method of defining and applying a GDV for each area of a current picture to inter-view prediction.

FIG. 12 is a diagram schematically illustrating an example of a method of defining the GDV for each area of the current picture and applying the defined GDVs to the inter-view prediction.

Referring to FIG. 12, a current picture (slice) is partitioned into areas having the same motion in a quad tree method. The optimal GDV information is allocated to each area having the same motion. The GDV for the current block may be determined to be a GDV of an area to which the current block belongs in the picture.

FIG. 12 illustrates an example where the current picture 1200 is partitioned up to a depth of 2 (partitioned twice). In the first partition in which the current picture 1200 is partitioned into four areas, it is assumed that the top-left block, the top-right block, and the bottom-left block have a motion in the block and the bottom-right block is partitioned into four areas having the same motion again.

As the partition result, three blocks 1210, 1240, and 1270 out of seven blocks have the same motion and use GDV0 which is the largest GDV in common. Two other blocks 1220 and 1250 have the same motion and uses GDV1 in common. Two remaining blocks 1130 and 1160 have the same motion and use GVD2 which is the smallest GDV in common.

At this time, the smallest unit of the quad-tree partition for allocating the GDV information may be limited to a predetermined size. For example, the smallest unit of the quad-tree partition may be limited to an LCU, a CU, a PU, or a TU, or may be limited to a predetermined size (for example, 4×4 pixels, 8×8 pixels, 16×16 pixels, 32×32 pixels, or 64×64 pixels), which is not a process unit.

The GDV for the current block may be determined to be the GDV of the area to which the current block belongs in the current picture. The video encoder may signal information of the GDV to be used for the inter-view prediction on the current picture to the video decoder. At this time, the GDV indicates the position of a specific partition (block, area) in a picture of a reference view on with respect to the current block. The video decoder may determine which GDV to use with reference to the quad-tree partition information in which the GDVs are allocated for the inter-view prediction at the time of decoding the current block (a CU or an LCU).

For example, the video encoder may transmit the GDV for the inter-view prediction on the current block and the video decoder may perform the inter-view prediction on the current block using the received GDV. At this time, the GDV may be determined for each area of the current picture split by the quad-tree partitioning.

Table 2 shows an example of the quad tree information on the GDV transmitted through the use of a sequence parameter set for the inter-view prediction.

TABLE 2

```
seq_parameter_set_rbsp( ) {
...
max_gdv_qtree_depth
max_gdv_unit_size_log_scale
...
```

The video encoder transmits largest depth information in which the GDV is defined in the sequence parameter set and information on the size of the largest block to which the GDV is allocated.

In Table 2, max_gdv_qtree_depth specifies the largest depth of the quad-tree structure relevant to the GDV. That is, max_gdv_qtree_depth represents the largest depth in the quad-tree structure of which the GDV information is transmitted.

max_gdv_unit_size_log_scale specifies the size of the largest area in the quad-tree structure relevant to the GDV information. For example, max_gdv_unit_size_log_scale represents a value obtained by applying logarithm (log 2) to a value, which is obtained by dividing the size of the largest area (for example, the largest unit) in the quad-tree structure of which the GDV information is transmitted by the size of a criterion block and scaling the resultant value. Here, a largest CU (LCU) may be used as the criterion block.

Table 3 shows an example of information to be transmitted through the use of the slice header for the inter-view prediction when the GDV is set for each area.

TABLE 3

```
slice_header ( ) {
  inter_view_motion_info_flag
  if(inter_view_motion_info_flag ) {
    num_gdv
    for( i=0 ; i<num_gdv ; i++ ) {
      inter_view_motion_reuse_dir[i]
      global_disparity_vector_x[i]
      global_disparity_vector_y[i]
    }
    if( num_gdv>1 ) {
      gdv_qtree(0,0)
    }
  }
}
gdv_qtree(i,depth) {
  if( depth<maxGdvQtreeDepth) {
    split_flag
    if (depth<maxGdvQtreeDepth && split_flag==1 ) {
      for( i=0 ; i<4 ; i++ ) {
        gdv_qtree(i,depth+1)
      }
    }
  }
```

TABLE 3-continued

```
  }
  if(depth == maxGdvQtreeDepth || split_flag==0) {
    gdv_id
  }
}
```

Referring to Table 3, the video encoder transmits information necessary for the inter-view prediction through the use of the slice header. The video decoder may acquire the information necessary for the inter-view prediction from the slice header by parsing or entropy-decoding the received bitstream and may perform the inter-view prediction on the basis of the acquired information.

Here, inter_view_motion_reuse_info_flag indicates whether the information on reuse of the motion information (for example, the motion vector) is transmitted through the use of the current slice corresponding to the slice header in the inter-view prediction. For example, the information on reuse of the motion information (for example, the motion vector) includes information indicating whether to reuse the motion information. The reuse of the motion information includes predicting the current block using the motion information of the neighboring blocks of the current block and the neighboring blocks of the current block include a block corresponding to the current block in another view.

inter_view_motion_reuse_dir specifies a view which is referred to by the current view when the motion information is reused in the inter-view prediction (when the motion information of the neighboring blocks is used). For example, a view in the first direction may be referred to when the value of inter_view_motion_reuse_dir is 0, and a view in the second direction may be referred to when the value of inter_view_motion_reuse_dir is 1. For example, when views of the multi-view are arranged along the viewpoints, it is assumed that the direction from the right view to the left view is defined as a direction L0, and the direction from the left view to the right view is defined as a direction L1. In addition, it is assumed that the view ID of the current view is 1, a view with a view ID of 0 is referred to in the direction L0, and a view with a view ID of 2 is referred to in the direction L1. When the value of inter_view_motion_reuse_dir is 0, the motion information of the view with a view ID of 0 may be used. When the value of inter_view_motion_reuse_dir is 1, the motion information of the view with a view ID of 2 may be used.

global_disparity_vector_x and global_disparity_vector_y specify the position of a block of which the motion information is referred to in the reference picture (for example, a picture having the same POC as the current picture) in the reference view with respect to the position of the current block (for example, a TU, a PU, or a CU to be decoded). In other words, global_disparity_vector_x and global_disparity_vector_y specify the x component and the y component of the GDV for the current block. The GDV for the current block represents a difference between the position corresponding to the position of the current block and the position of the reference block in the reference picture (or a difference between the position of the current block and the position of the reference block in the current picture). The values of global_disparity_vector_x and global_disparity_vector_y, that is, the values of the GDV, may be defined in the unit of predetermined pixels, for example, 4 pixels, 8 pixels, or 16 pixels.

num_gdv specifies the number of areas having the same GDV. In other words, num_gdv specifies the number of GDVs used for the inter-view prediction. In the example illustrated in FIG. 11, 3 may be transmitted as the value of num_gdv.

Referring to Table 3, when the value of num_gdv is greater than 0, a quad-tree structure for allocating the GDV is set. A flag split_flag indicating whether to split in the quad-tree structure is transmitted.

The GDV is specified by a partitioning index i and the depth of partitions split in the quad-tree structure. In case of split into four blocks, as the values of the partitioning indices, 0 may be allocated to the top-left block, 1 may be allocated to the top-right block, 2 may be allocated to the bottom-right block, and 3 may be allocated to the bottom-left block.

When the depth of the corresponding block is the largest depth in the quad-tree structure for allocating the GDV or is not split any more, the GDV value of the block is transmitted.

It has been described above that a 3D video is encoded/decoded reusing the motion information of the texture video out of multi-view videos, but the present invention is not limited to this configuration and may be applied to a depth video.

A depth video includes a series of depth images and each depth image expresses the distances from the optical center of cameras capturing the image to points of a 3D scene using gray levels.

A depth video captures a 3D structure of a scene and most parts of the depth image include gray values which are separated by an edge indicating a boundary of an object in the image and smoothly varying along the surface of the object FIG. 13 is a diagram schematically illustrating an example where a single scene is displayed as a texture video and a depth video.

FIG. 13(a) illustrates a texture video of a scene in which a person appears. FIG. 13(b) illustrates a depth video of a scene in which a person appears and which is expressed in gray levels along the surface of an object in the scene.

The depth video expresses geometric description. In other words, the depth video expresses the distances to scene contents in a texture video. Accordingly, the temporal evolution of motion contents in the texture video has a high correlation with the temporal evolution of motion contents in the corresponding depth video. For example, the motion vectors around the boundary of an object tend to match in the texture video and the depth video.

Therefore, it is possible to further effectively encode/decode a depth video by utilizing similarity in motion information between the depth video and the texture video.

As described above, the depth video has characteristics correlated with the corresponding texture video and exhibits a high correlation in the boundary area of an object. Accordingly, motion information (for example, motion vectors) of a texture video may be reused as motion information (for example, motion vectors) of the corresponding depth video.

Figure 14:
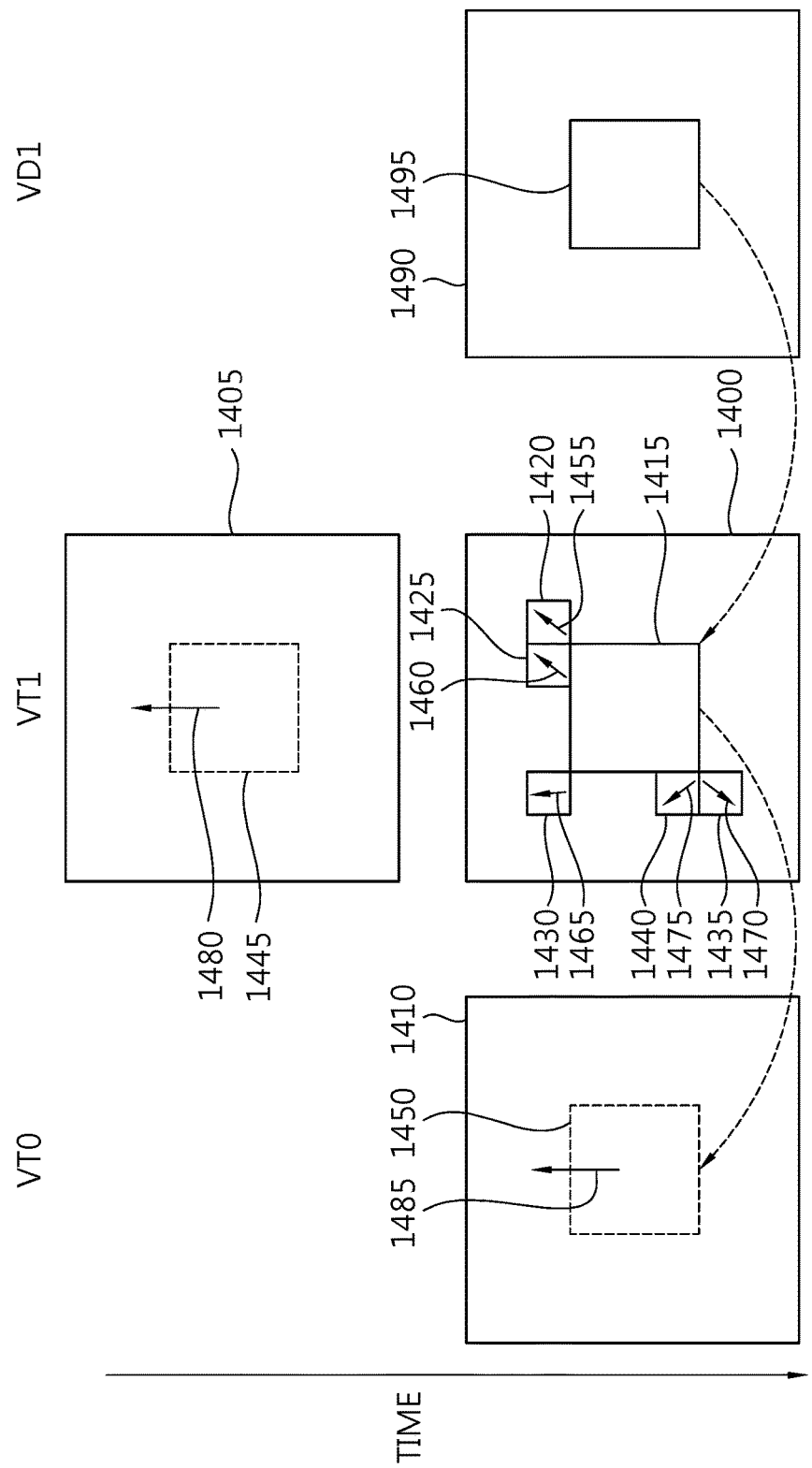
FIG. 14 is a diagram schematically illustrating a method of predicting a depth picture of a current view using motion information of a texture picture.

FIG. 14 is a diagram schematically illustrating a method of predicting a depth video of a current view using motion information of a texture video.

Referring to FIG. 14, a current depth block 1495 of a current depth picture 1490 out of depth videos VD1 of view V1 may be predicted using motion information a texture block 1415 corresponding to the current depth block 1495 in a text picture 1400 having the same POC as the current depth picture 1490 out of texture videos VT1 of view V1. For example, motion vectors of the texture block 1415 corresponding to the current depth block 1495 may be used as motion vectors of the current depth block 1495.

At this time, the motion information of the texture block 1415 may be predicted on the basis of the motion information of the neighboring blocks. For example, as in the example illustrated in FIG. 10, inter-view prediction may be performed on the current texture block 1415 of the current view V1 using motion information of a reference texture picture 1410 having the same POC as the current picture 1400 out of texture videos VT0 of a reference view V0.

Motion vector predictor candidates which can be used by the current texture block 1415 includes motion information 1455, 1460, 1465, 1470, and 1475 of a top-right corner block 1420, a top block 1425, a top-left corner block 1430, a bottom-lower corner block 1435, and a left block 1440 which are spatial neighboring blocks and motion information 1480 of a Col block 1445 in another texture picture 1405 of the current view V1. Motion information 1485 of a reference block 1450 corresponding to the current texture block 1415 in the texture picture 1410 having the same POC as the current texture picture 1400 out of pictures in another view may be used as the motion vector predictor candidate.

The video encoder may determine which motion vector predictor to use for prediction of the current texture block 1415 out of the motion vector predictor candidates and may transmit information on the determined motion vector predictor to the video decoder. The video encoder may determine whether to use the motion information (motion vector) of the current texture block 1415 as the motion information of the current depth block 1495 and may transmit information thereon.

The video decoder may derive the motion vector predictor to be used for the prediction of the current texture block 1415 on the basis of the information transmitted from the video encoder. The video decoder may derive the motion information (motion vector) of the current depth block 1495 using the motion information of the current texture block 1415 on the basis of the information transmitted from the video encoder.

In FIG. 14, terms such as the current texture block, the current depth block, the current texture picture, and the current depth picture are used for the purpose of convenience of explanation, but this does not mean that the current texture block and the current depth block are simultaneously encoded or decoded, and means that the there is a relationship that the motion information of the current texture block can be used by the current depth block.

On the other hand, when the motion information of an object in the texture picture is used to encode/decode the depth picture, the object moves toward the camera or moves apart from the camera and there may be a difference between an object depth of a reference picture referred to by the texture picture and an object depth of the depth picture. The difference in depth value may cause a great difference between the motion vector acquired from the texture picture and the motion vector of the depth picture.

Accordingly, when the motion information of the corresponding texture picture is used as the motion information of the depth picture and there is a motion of an object in a scene which may cause a difference in depth value, a method of selectively applying a DC offset to compensate for the difference may be considered.

When the depth picture is processed reusing the motion information of a texture picture, it is possible to further effectively encode/decode the depth picture.

Specifically, in reusing a motion vector, a motion vector split/merge mode may be introduced to determine how to reuse the motion vector of the corresponding texture block (for example, a macro block, a CU, a PU, or a TU) for prediction of the depth picture.

When a difference in depth value is caused due to a motion in which an object moves apart from the camera in a scene or a motion in which the object moves close to the camera, a DC offset value may be retrieved or determined and used to compensate for the difference.

The DC offset value may be determined by the video encoder in consideration of costs. Expression 1 expresses an example of a method of determining reuse of a motion vector on the basis of rate-distortion optimization.

$$J(mb\_type, reuse\_type \mid \lambda) =$$
$$D + \lambda(R_{MV} + R_{mb\_type} + R_{reuse\_type} + R_{offset})$$
$$D = \sum_{X \in MB} (I(X) - I_{ref}(X_p) - D_{offset})^2$$

⟨Expression 3⟩

In Expression 3, J represents the cost, and λ represents a Lagrange multiplier.

I corresponds to the pixel value of the depth picture and $I_{ref}$ corresponds to the pixel value of the reference depth picture.

$D_{offset}$ represents a DC offset value for minimizing D when the value of reuse_type is 1. The motion vector MV of the depth block may be derived from the corresponding block of the texture picture using the value of $D_{offset}$.

Xp represents the sum of the position X and the motion vector MV of a target pixel in the depth block and also represents the predicted sample position in the reference picture indicated by the motion vector.

$R_{MV}$ represents a bit rate for encoding the motion vector associated with the reference picture index refIdx and has a value of 0 when the value of reuse_type is 1.

$R_{offset}$ represents a bit rate for encoding $D_{offset}$ presented only when the value of reuse_type is 1.

$R_{mb\_type}$ represents a bit rate for encoding block type information mb_type and $R_{reuse\_type}$ represents a bit rate for encoding a motion vector reuse type MV reuse_type.

mb_type indicates the size and/or the prediction mode (for example, the skip mode, the merge mode, and the MVP mode) of the corresponding block (for example, a macro block, a CU, a PU, or a TU).

In Expression 3, it is assumed that the corresponding block is a macro block, but the present invention is not limited to this assumption and details of Expression 3 may be similarly applied to a case where the corresponding block is a CU, a PU, a TU, or the like.

The video encoder may determine necessary information including the DC offset $D_{offset}$ on the basis of Expression 1. The video encoder may perform compensation for the texture picture when the depth picture reuses the motion information of the texture picture using the DC offset information. The video encoder may transmit information including the DC offset to the video decoder.

The video decoder may perform a decoding process on the depth picture on the basis of the received information. For example, when the information received from the video encoder indicates decoding of a depth picture based on the motion information of a texture picture, the video decoder may decode the current depth block using the motion information (for example, motion vector) of the corresponding texture picture and the DC offset value.

At this time, as described above, the video encoder may transmit information indicating whether to use the motion information of a corresponding texture block and how to use the motion information of the texture block to the video decoder.

Table 4 shows an example of a syntax for signaling information for using the motion information of a texture picture to decode a depth picture.

TABLE 4

| coding_unit( x0, y0, log2Cb Size ) { |
| --- |
| ... |
| reuse_type |
| ... |
| If (reuse_type){ |
| ... |
| DC_offset |
| ... |

Table 4 shows an example where a current depth block is a CU. Referring to Table 4, reuse_type indicates whether to use the motion information of a texture picture to decode the current depth block. When reuse_type indicates that the texture picture is used, the DC offset value for compensating for a motion of an object (a motion causing a difference in depth, for example, a motion toward the camera) between the texture picture and the depth picture is transmitted.

Specifically, when the value of reuse_type is 0, the current depth block is decoded without using the motion information of the texture picture. Therefore, the current depth block may be predicted using a general prediction mode.

For example, when the intra prediction is used, the current depth block may be intra-predicted using neighboring pixels in the current depth picture. When the inter prediction is used, the current depth block may be inter-predicted on the basis of a reference depth picture using the skip mode, the merge mode, or the MVP mode. The inter prediction and the intra prediction of a depth picture may be performed in the same way as the inter prediction and the intra prediction of a texture picture.

When the value of reuse_type is 0, the DC offset value for compensating for the motion of an object between the texture picture and the depth picture is not transmitted.

When the value of reuse_type is 1, the current depth block is decoded using the motion information of the texture picture. Accordingly, the prediction on the current depth picture. may be performed on the basis of the motion information of the corresponding texture block. In this case, as shown in Table 4, the DC offset value for compensating for the motion of an object between the texture picture and the depth picture may be transmitted to the video decoder. The DC offset value may be added to the reconstructed pixel values of the current depth block to compensate for the motion of an object between the texture picture and the depth picture When the value of reuse_type is 1, the motion information (for example, motion vector) of the current depth picture may be derived from the motion information (for example, motion vector) of the texture picture in consideration of the size of the texture block corresponding to the current depth block.

In Table 4, it is described that the value of DC_offset is transmitted when the value of reuse_type is 1, but the value of DC_offset may be selective used as described above. For example, when the value of reuse_type is 1, the motion information of the texture picture is used, and there is no difference or a small difference in depth value between the texture picture to be referred to and the depth picture, the value of DC_offset may not be transmitted or the value of DC_offset may be set to 0.

FIG. 15 is a diagram schematically illustrating a method of deriving the motion vector of a current depth block from the motion vector of a corresponding texture block.

When the size of the current depth block is equal to or larger than the size of the corresponding texture block (for example, a candidate mb_type indicated from the video encoder), the motion vector of the current depth block may be derived on the basis of the motion vector of the corresponding texture block and the motion vectors of the neighboring blocks of the corresponding texture block. For example, the motion vector of the current depth block may be derived as an average of the motion vector of the corresponding texture block and the motion vectors of the neighboring blocks of the corresponding texture block. Alternatively, the motion vector of the current depth block may be derived as a median of the motion vector of the corresponding texture block and the motion vectors of the neighboring blocks of the corresponding texture block. Here, the corresponding texture block may be a macro block, a CU, a PU, a TU, or the like.

FIG. 15(a) is a diagram schematically illustrating a method of deriving a motion vector of a current depth block when the size of the current depth block is equal to or larger than the size of the corresponding texture block (for example, a candidate mb_type indicated from the video encoder).

Referring to FIG. 15(a), when the size of a current depth block 1500 is equal to or larger than the size of the corresponding texture block 1510, the motion vector of the current depth block 1500 may be determined on the basis of the motion vector of the corresponding texture block 1510 and the motion vectors of neighboring texture blocks 1520, 1530, 1540, 1550, and 1560 thereof. For example, the motion vector of the current depth block 1500 may be derived as the average of the motion vector of the corresponding texture block 1510 and the motion vectors of the neighboring texture blocks 1520, 1530, 1540, 1550, and 1560 thereof. Alternatively, the motion vector of the current depth block 1500 may be derived as the median of the motion vector of the corresponding texture block 1510 and the motion vectors of the neighboring texture blocks 1520, 1530, 1540, 1550, and 1560 thereof.

When the size of the current depth block 1500 is equal to or larger than the size of the corresponding texture block 1510, the motion vector of the current depth block 1500 may be derived using only a part of the motion vectors of the neighboring texture blocks. For example, the motion vector of the current depth block 1500 may be derived as the median or the average of the motion vector of the corresponding texture block 1510, the motion vector of the left texture block 1530, and the motion vector of the top texture block 1500.

When the size of the current depth block is smaller than the size of the corresponding texture block (for example, a candidate mb_type indicated from the video encoder), the motion vector of the current depth block may be derived on the basis of the motion vectors of sub-blocks in the corresponding texture block. For example, the motion vector of the current depth block may be derived as the average of the motion vectors of the sub-blocks in the corresponding texture block. Alternatively, the motion vector of the current depth block may be derived as the median of the motion vectors of the sub-blocks in the corresponding texture block. Here, the corresponding texture block and/or the sub-blocks in the corresponding texture block may be a macro block, a CU, a PU, a TU, or the like.

FIG. 15(b) is a diagram schematically illustrating a method of deriving a motion vector of a current depth block when the size of the current depth block is smaller than the size of the corresponding texture block (for example, a candidate mb_type indicated from the video encoder).

Referring to FIG. 15(b), when the size of the current depth block 1570 is smaller than the size of the corresponding texture block 1580, the motion vector of the current depth block 1570 may be determined on the basis of the motion vectors of the sub-blocks $sb_0, sb_1, \ldots, sb_i,$ and $sb_n$ (where n is the number of sub-blocks) in the corresponding texture block 1580. For example, the motion vector of the current depth block 1570 may be derived as the average of the motion vectors of the sub-blocks $sb_0, sb_1, \ldots, sb_i,$ and $sb_n$ in the corresponding texture block 1580. Alternatively, the motion vector of the current depth block 1570 may be derived as the median of the motion vectors of the sub-blocks $sb_0, sb_1, \ldots, sb_i,$ and $sb_n$ in the corresponding texture block 1580.

Figure 16:
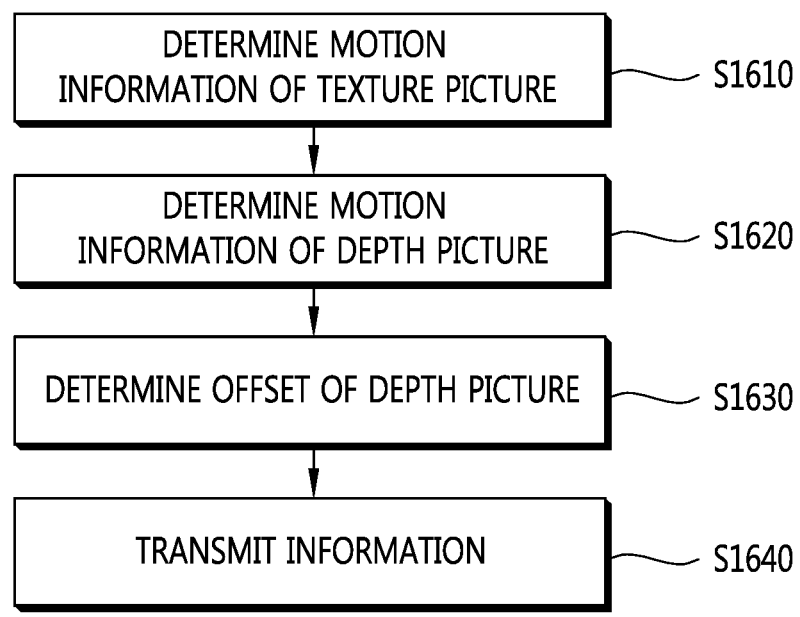
FIG. 16 is a flowchart schematically illustrating a method of encoding a 3D video reusing motion information according to the present invention.

FIG. 16 is a flowchart schematically illustrating a method of encoding a 3D video reusing motion information according to the present invention.

Referring to FIG. 16, the video encoder determines motion information of a texture picture in a current view (S1610). The video encoder may determine the motion information of a current block to be decoded (or a prediction target block) of the texture picture using the motion information of neighboring blocks. Here, the neighboring blocks include a block corresponding the current block of a picture in a different view having the same POC as the current picture in addition to the spatial neighboring blocks and the temporal neighboring blocks of the current block (corresponding blocks of different pictures in the same view). The video encoder may perform prediction on the current block using the motion information of the current block determined on the basis of the motion information of the neighboring blocks and may encode the current block. Details of the prediction and the encoding are the same as described above with reference to FIG. 2.

The video encoder may determine motion information of a depth picture (S1630). The video encoder may determine the motion information of the depth picture on the basis of the motion information of a texture picture or may determine the motion information of the depth picture on the basis of the motion information of another depth picture (the motion information of a reference block in a reference depth picture).

The video encoder may determine an offset value of the depth picture (S1630). When the depth picture uses the motion information of the texture picture, there may be a difference in depth between an object in a block referred to by the texture picture and the object in the current depth block. The video encoder may compensate for the reconstructed pixel values using the DC offset in consideration of the difference in depth.

The video encoder may transmit the motion information (S1640). The video encoder may encode the motion information of the texture picture and the motion information of the depth picture and may transmit the encoded information to the video decoder through a bitstream. The transform, quantization, rearrangement, and entropy encoding which are performed in the course of encoding are the same as described above with reference to FIG. 2.

The transmitted information may include the information described with reference to Tables 1 to 4.

The video encoder may transmit information (for example, inter_view_motion_info_flag) indicating whether to use the motion information of a reference picture belonging to a different view when the inter-view prediction is performed, information (for example, inter_view_motion_reuse_dir) indicating in what direction to refer to a view when the motion information of a reference picture belonging to a different view is used, and information (for example, global_disparity_vector_x and global_disparity_vector_y) on the GDV value indicating the position of a reference block. When the GDV is set for each area of the current picture, information (for example, num_gdv) indicating the number of GDVs defined in the current picture, information (split_flag) on the areas of which the GDV is defined, and GDV information (gdv_id) in the current area may be transmitted together. Here, information on the largest depth (for example, max_gdv_qtree_depth) of partitioning of the areas of which the GDV is defined and information (for example, max_gdv_unit_size_log_scale) on the largest size of the areas may be transmitted together or separately.

The video encoder may also transmit information (for example, reuse_type) indicating whether to derive the motion information of the depth picture on the basis of the motion information of a texture picture and information (for example, DC_offset) on the offset values for compensating for the reconstructed pixel values when the motion information of the depth picture is derived on the basis of the motion information of the texture picture.

The positions of the information pieces to be transmitted are the same as described with reference to Tables 1 to 4.

It is described with reference to FIG. 16 that the respective steps are performed by the video encoder, but the present invention is not limited to this configuration. For example, the determination of the motion information and the offset may be performed by the prediction module of the video encoder.

Figure 17:
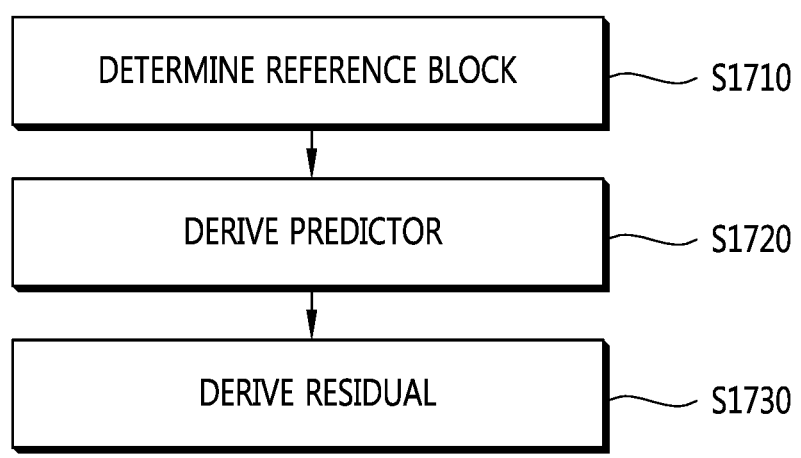
FIG. 17 is a flowchart schematically illustrating an example of a method of determining motion information of a texture picture and performing prediction using the motion information in a video encode according to the present invention.

FIG. 17 is a flowchart schematically illustrating an example of a method of determining motion information of a texture picture and performing a prediction process using the determined motion information in the video encoder.

Referring to FIG. 17, the video encoder determines a reference block to be used for prediction of a current texture block (S1710). The prediction of the current texture block includes the inter prediction in the same view and the inter-view prediction between different views. The video encoder may determine a reference block out of neighboring blocks of the current texture block. The blocks which are the neighboring blocks of the current texture block which can use the motion information of the corresponding block are the same as described with reference to FIGS. 9 and 10.

The video encoder may determine the motion information of the reference block as a motion information predictor (S1720). The video encoder may use the motion information of the selected reference block out of the reference block candidates as the motion information predictor. The motion information predictor may include only information on the motion vector of the corresponding block or may include information on the motion vector and the reference picture index. When the motion information predictor includes only the information on the motion vector of the corresponding block, the video encoder may separately transmit the information of the reference picture necessary for the prediction to the video decoder.

The video encoder may derive a residual of the current texture block on the basis of the motion information predictor (S1730). When the skip mode or the merge mode is used for the inter prediction or the inter-view prediction, the motion information predictor may include the reference picture index as well as the motion vector. In this case, the video encoder may construct a predicted block on the basis of the pixel values of the block indicated by the motion information predictor and may derive the residual of the current texture block. In the skip mode, the video encoder may not generate a residual or may not transmit a residual. When the MVP is used for the inter prediction or the inter-view prediction, the motion information predictor to be used for the prediction may include the motion vector predictor, that is, the MVP information and the reference picture index may be separately determined. In this case, the video encoder may construct the predicted block of the current texture block on the basis of the motion information predictor and the reference picture index and may derive the residual of the current texture block.

Figure 18:
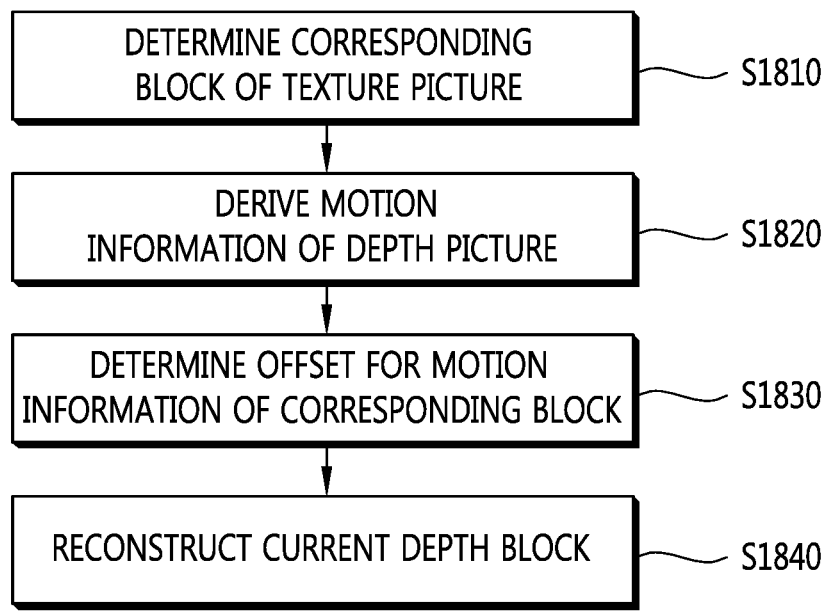
FIG. 18 is a flowchart schematically illustrating an example of a method of predicting a depth picture using motion information of a texture picture according to the present invention.

FIG. 18 is a flowchart schematically illustrating an example of a method of performing a prediction process on a depth picture using motion information of a texture picture as a method of determining motion information of a depth picture and performing a prediction process using the motion information in the video encoder.

Referring to FIG. 18, when the motion information of a texture picture is used, the video encoder determines a block of the texture picture corresponding to a current depth block (S1810). The video encoder may determine the motion information of the current depth picture using the motion information of the texture picture. In this case, the video encoder determines a block of a texture picture to be referred to by the current depth block. The block of the texture picture corresponding to the current depth picture may be a block of a texture picture of the same view and the same POC as the current depth picture. The corresponding block of the texture picture may be a co-located block of the current depth block in a texture picture of the same view and the same POC as the depth picture. The corresponding block in the texture picture may be a block including a pixel corresponding to a pixel specifying the current depth block in the texture picture of the same view and the same POC as the depth picture.

The video encoder may derive the motion information of the current depth block on the basis of the motion information of the texture picture (S1820). The motion information of the current depth block may be determined on the basis of the motion information of the corresponding texture block. The motion information of the current depth block may be determined using the motion information of the corresponding texture block and the motion information of neighboring blocks of the corresponding texture block. At this time, the method of determining the motion information of the current depth block on the basis of the motion information of the texture picture is the same as described with reference to FIG. 15.

The video encoder may determine the offset of the current depth block (S1830). As described above, when the depth picture uses the motion information of the texture picture, a difference in depth may occur between an object in a block referred to by the texture picture and the object in the current depth block. The video encoder may determine the DC offset value in consideration of the difference in depth. The error of the reconstructed pixel values due to the difference in depth may be compensated for using the DC offset.

The video encoder reconstructs the current depth block (S1840). The video encoder may reconstruct the current depth block using the texture picture. When the skip mode or the merge mode is used, the motion information f the current depth block acquired from the motion information of the texture picture may include a reference picture (reference depth picture) index as well as the motion vector. The video encoder may construct a predicted block on the basis of the pixel values of the depth block indicated by the motion information of the current depth block acquired from the motion information of the texture picture and may derive the residual of the current depth block. When the MVP is used for the inter prediction or the inter-view prediction, the motion information may include the motion vector predictor, that is, the MVP information, and the reference picture index may be separately determined. In this case, the video encoder may construct a predicted block of the current depth block on the basis of the motion information predictor and the reference picture (reference depth picture) index and may derive the residual of the current depth block.

The video encoder may use the depth block (depth picture) reconstructed on the basis of the residual and the predicted block for predicting a depth block to be encoded later. The video encoder may encode information on the residual of the current depth block and the information on the prediction and may transmit the encoded information to the video decoder.

On the other hand, it is described above with reference to FIGS. 16 and 18 that the current depth block is reconstructed using the motion information f the texture picture, but the current depth block may be encoded using the motion information of another depth picture as described with reference to Table 4. The video encoder may transmit information indicating whether to use the motion information of the texture picture as shown in Table 4 to the video decoder.

Figure 19:
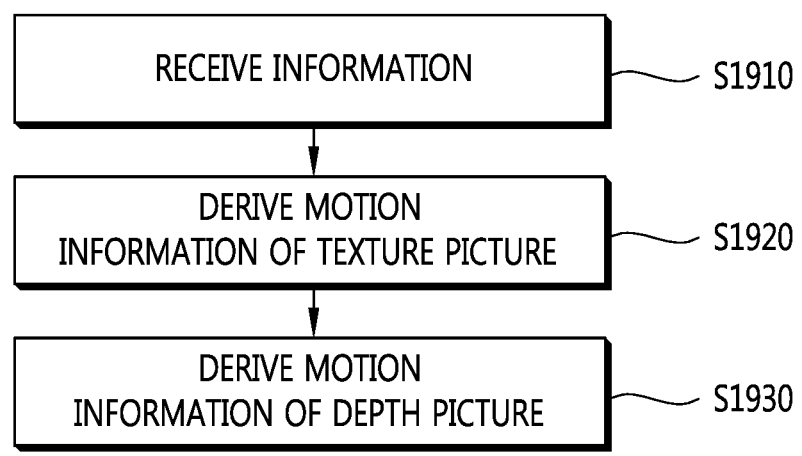
FIG. 19 is a flowchart schematically illustrating a method of decoding a 3D video reusing motion information according to the present invention.

FIG. 19 is a flowchart schematically illustrating a method of decoding a 3D video reusing the motion information according to the present invention.

Referring to FIG. 19, the video decoder receives information (bitstream) from the video encoder S(1910). The received information (bitstream) includes parameters and the like necessary for the decoding in addition to the picture information including the residual. The video decoder may acquire necessary information through the entropy decoding.

The received information may include the information described with reference to Tables 1 to 4. For example, the received information may include information (for example, inter_view_motion_info_flag) indicating whether to use the motion information of a reference picture belonging to a different view when the inter-view prediction is performed, information (for example, inter_view_motion_reuse_dir) indicating in what direction to refer to a view when the motion information of a reference picture belonging to a different view is used, and information (for example, global_disparity_vector_x and global_disparity_vector_y) on the GDV value indicating the position of a reference block. When the GDV is set for each area of the current picture, the received information may include information (for example, num_gdv) indicating the number of GDVs defined in the current picture, information (split_flag) on the areas of which the GDV is defined, and GDV information (gdv_id) in the current area. Here, information on the largest depth (for example, max_gdv_qtree_depth) of partitioning of the areas of which the GDV is defined and information (for example, max_gdv_unit_size_log_scale) on the largest size of the areas may be received together or separately.

The received information may include information (for example, reuse_type) indicating whether to derive the motion information of the depth picture on the basis of the motion information of a texture picture and information (for example, DC_offset) on the offset values for compensating for the reconstructed pixel values when the motion information of the depth picture is derived on the basis of the motion information of the texture picture.

The positions of the information pieces in the transmitted (received) bitstream are the same as described with reference to Tables 1 to 4.

The video decoder may derive the motion information of the texture picture on the basis of the received information (S1920). The video decoder may derive the motion information of the current block on the basis of the motion information of the corresponding block in another view when the received information indicates reuse of the motion information in the inter-view prediction. For example, when the merge mode or the skip mode is used in the inter-view prediction, the video decoder may use the motion information of the corresponding block in another view as the motion information of the current texture block. At this time, the motion information includes a motion vector and a reference picture index. When the MVP is used in the inter-view prediction, the video decoder may derive the motion vector of the current block by using the motion vector of the corresponding block in another block as a predictor and adding the motion vector to a motion vector difference value. In this case, the reference picture index and the motion vector difference value may be transmitted from the video encoder.

The video decoder may derive the motion information of the depth picture (S1930). The video decoder may derive the motion information of the current depth block reusing the motion information of the texture picture and may derive the motion information of the current depth block on the basis of the motion information of another texture picture. Whether to reuse the motion information of the texture picture may be indicated by the information transmitted from the video encoder.

The video decoder may reconstruct a texture picture (texture block) using the derived motion information. For example, when the skip mode or the merge mode is used in the inter prediction or the inter-view prediction, the derived motion information may include a reference picture index in addition to a motion vector. The video decoder may construct a predicted block on the basis of the pixel values of the block indicated by the motion information. The video decoder may reconstruct a current texture block by adding the residual of the current texture block to the predicted block. When the skip mode is used, the residual may not be transmitted and the video decoder may use the predicted block as the reconstructed block. When the MVP is used in the inter prediction or the inter-view prediction, the reference picture index may be separately transmitted. The video decoder may construct a predicted block of the current texture block on the basis of the motion information and the reference picture index and may reconstruct the current texture block by addition to the residual.

The video decoder may reconstruct a depth picture (depth block) using the derived motion information. When the skip mode or the merge mode is used in the inter prediction or the inter-view prediction, the motion information may include a reference picture (reference depth picture) index in addition to a motion vector. The video decoder may construct a predicted block of the current depth block on the basis of the pixel values of the block indicated by the motion information and may construct a reconstructed block by adding the residual to the predicted block. When the skip mode is used, the video decoder may use the predicted block as the reconstructed block. When the MVP is used in the inter prediction or the inter-view prediction, the reference picture (reference depth picture) index may be separately transmitted. The video decoder may construct a predicted block of the current depth block on the basis of the motion information and the reference picture (reference depth picture) index and may construct the reconstructed block by addition to the residual.

It has been described above for the purpose of convenience of explanation that the video decoder performs the steps of FIG. 19, but a part or all of the steps of FIG. 19 may be performed by a predetermined module of the video decoder. For example, steps S1920 and S1930 may be performed by the prediction module of the video decoder.

Figure 20:
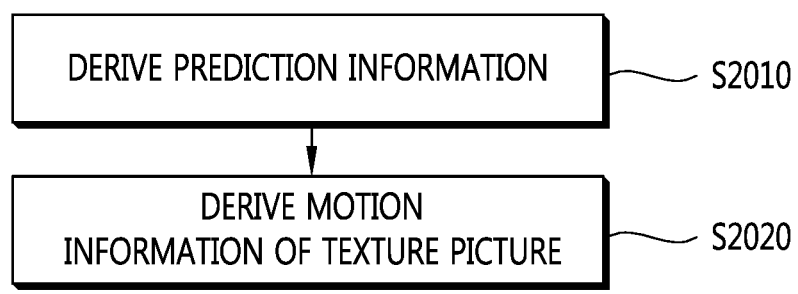
FIG. 20 is a diagram schematically illustrating an example of a method of deriving motion information of a texture picture in a video decoder according to the present invention.

FIG. 20 is a diagram schematically illustrating an example of a method of deriving motion information of a texture picture in the video decoder according to the present invention.

Referring to FIG. 20, the video decoder derives information necessary for prediction from the information received from the video encoder (S2010). The information necessary for prediction may be received from the video encoder through the use of a bitstream. The received information may include the information described with reference to Tables 1 to 3. For example, the received information may include information (for example, inter_view_motion_info_flag) indicating whether to use the motion information of a reference picture belonging to a different view when the inter-view prediction is performed, information (reference view direction information) indicating in what direction to refer to a view when the motion information of a reference picture belonging to a different view is used, and information on the GDV value indicating the position of a reference block. When the GDV is set for each area of the current picture, the received information may include information indicating the number of GDVs defined in the current picture and split information on the areas of which the GDV is defined.

The video decoder may derive the motion information of the texture picture (S2020). When the inter-view prediction is performed, the video decoder may use pictures of the same POC in the view referred to by the current view out of views in the direction indicated by the reference view direction information (for example, inter_view_motion_reuse_dir) transmitted from the video encoder as a reference picture. At this time, a reference block of the reference picture may be indicated by the GDV information (for example, global_disparity_vector_x and global_disparity_vector_y or gdv_id).

When the skip mode or the merge mode is used, the motion information of the reference block may be used as the motion information of the current texture block. In this case, the motion information includes a motion vector and a reference picture index.

When the MVP is used, the video decoder may use the motion vector of the reference block as the motion vector predictor of the current texture block and may create the motion vector of the current texture block by adding the motion vector difference received from the video encoder thereto. In this case, the reference picture index may be transmitted from the video encoder.

Figure 21:
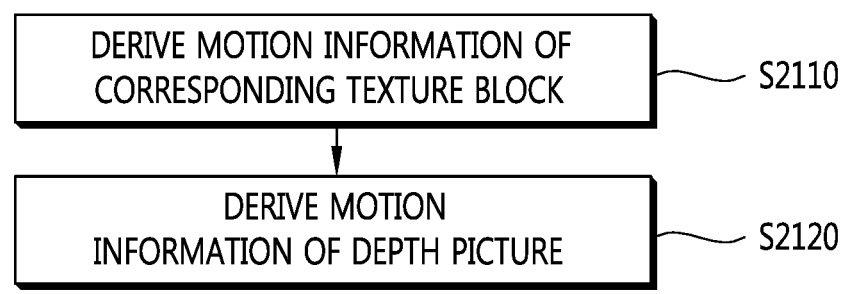
FIG. 21 is a schematically illustrating an example of a method of deriving motion information of a depth picture in the video decoder according to the present invention.

FIG. 21 is a diagram schematically illustrating an example of a method of deriving motion information of a depth video in the video decoder according to the present invention.

Referring to FIG. 21, the video decoder derives motion information of a texture block corresponding to a current depth block (S2110). The method of deriving the motion information of the texture block is the same as described above with reference to FIG. 20.

The video decoder derives motion information of the current depth block (S2120). When the information received from the video encoder indicates that the motion information of the texture picture is used (for example, reuse_type=1), the video decoder derives the motion information of the current depth picture on the basis of the motion information of the corresponding texture block. The method of deriving the motion information of the current depth block on the basis of the motion information of the texture block is the same as described above with reference to FIG. 15.

When the information received from the video encoder indicates that the motion information of the texture picture is not used (for example, reuse_type=0), the video decoder may derive the motion information of the current depth block with reference to another depth picture in the same view.

The video decoder may reconstruct a depth picture (depth block) using the derived motion information. For example, when the skip mode or the merge mode is used in the inter prediction or the inter-view prediction, the derived motion information may include a reference picture (reference depth picture) index in addition to a motion vector. The video decoder may construct a predicted block on the basis of the pixel values of the block indicated by the motion information. The video decoder may reconstruct a current texture block by adding the residual of the current depth block to the predicted block. When the skip mode is used, the residual may not be transmitted and the video decoder may use the predicted block as the reconstructed block. When the MVP is used in the inter prediction or the inter-view prediction, the reference picture index may be separately transmitted. The video decoder may construct a predicted block of the current depth block on the basis of the motion information and the reference picture index and may reconstruct the current depth block by addition to the residual.

On the other hand, the video decoder may reconstruct the current depth block using the offset value when the current depth block is reconstructed using the motion information of a texture picture (for example, reuse_type=1) and the value of DC_offset is transmitted from the video encoder.

FIGS. 16 to 21 schematically illustrate the methods according to the present invention for the purpose of facilitating understanding of the above-mentioned details of the present invention. It should be noted that this does not exclude details not illustrated in FIGS. 16 to 21 out of the above-mentioned details of the present invention In this description, a "video" and a "picture" are mixed, which does not mean that the "video" and the "picture" are conceptually distinguished from each other. The "video" in this description is a concept including the "picture" and may mean a "picture" depending on technical details.

In this description, a "depth video", a "depth picture", and a "depth map" are mixed, which does not mean that the "depth video", the "depth picture", and the "depth map" are conceptually distinguished from each other. In this description, it should be noted that the "depth video", the "depth picture", and the "depth map" may be used as the same a concept.

In this description, an expression, "a depth video uses motion information of a texture video", means that the motion information of a current depth block in a depth video is determined on the basis of motion information (pieces) of the corresponding texture block(s) and includes using the motion information of the texture block as motion information of a depth block or deriving the motion information of the depth block using the motion information of the texture blocks.

While the methods in the above-mentioned embodiments have been described on the basis of the flowcharts as a series of steps or blocks, the invention is not limited to the order of the steps and a certain step may be performed in an order other than described above or at the same time as described above. The above-mentioned embodiments include various examples. Therefore, the invention includes all substitutions, corrections, and modifications belonging to the appended claims.

The invention claimed is:

1. A video decoding method by a decoding apparatus, the method comprising:
   receiving information for deriving motion information of a current depth block of a current depth picture in a current view;
   determining, in a reference texture picture, a reference texture block corresponding to the current depth block based on a specific disparity vector;
   deriving a median value of motion vectors of the reference texture block and neighboring blocks of the determined reference texture block based on a size of the current depth block being equal to or larger than a size of the reference texture block;
   deriving motion information candidates of the current depth block based on the derived median value and motion information of neighboring blocks of the current depth block;
   deriving the motion information of the current depth block based on the received information for deriving the motion information and the motion information candidates; and
   performing prediction to generate predicted pixels of the current depth block based on the motion information of the current depth block,
   wherein a merge mode is applied to the current depth block,
   wherein the neighboring blocks of the reference texture block include a left neighboring block of the reference texture block and a top neighboring block of the reference texture block,
   wherein the motion information candidates include motion information comprising the median value as a motion vector,
   wherein the motion information of the current depth block is determined based on the motion information comprising the median value as the motion vector,
   wherein the specific disparity vector is determined for an area in the current depth picture,
   wherein the area for which the specific disparity vector is determined is split based on a quad tree structure, and
   wherein the reference texture block is a block of the reference texture picture in a reference view.

2. The method of claim 1, wherein the block of the reference texture picture in the reference view is set as the reference texture block when the information for deriving the motion information includes information indicating that the motion information of the current depth block is derived based on motion information of a block in another view.

3. The method of claim 2, wherein the information for deriving the motion information includes at least one of information indicating a direction of the reference view or information indicating the specific disparity vector.

4. The method of claim 1, wherein the information for deriving the motion information includes:
   information indicating a largest depth of the quad tree structure, and
   information indicating a value the specific disparity vector when the current depth block corresponds to the area having the largest depth.

5. The method of claim 1, wherein the information for deriving the motion information includes:
   information indicating whether to split the area which the specific disparity vector is determined, and
   information indicating a value of the specific disparity vector when the area which the specific disparity vector is determined is not split.

6. A video encoding method by an encoding apparatus, the method comprising:
   determining, in a reference texture picture, a reference texture block corresponding to a current depth block of a current depth picture in a current view based on a specific disparity vector;
   deriving a median value of motion vectors of the reference texture block and neighboring blocks of the determined reference texture block based on a size of the current depth block being equal to or larger than a size of the reference texture block;
   deriving motion information candidates of the current depth block based on the derived median value and motion information of neighboring blocks of the current depth block;
   determining motion information of the current depth block based on the motion information candidates; and
   transmitting information for deriving the motion information,
   wherein a merge mode is applied to the current depth block,
   wherein the neighboring blocks of the reference texture block include a left neighboring block of the reference texture block and a top neighboring block of the reference texture block,
   wherein the motion information candidates include motion information comprising the median value as a motion vector,
   wherein the motion information of the current depth block is determined based on the motion information comprising the median value as the motion vector,
   wherein the specific disparity vector is determined for an area in the current depth picture,
   wherein the area for which the specific disparity vector is determined is split based on a quad tree structure, and
   wherein the reference texture block is a block of the reference texture picture in a reference view.

7. A non-transitory computer-readable storage medium storing video information including information for deriving motion information, the video information, when executed, causing a decoding apparatus to perform operations comprising:
   determining, in a reference texture picture, a reference texture block corresponding to a current depth block of a current depth picture in a current view based on a specific disparity vector;
   deriving a median value of motion vectors of the reference texture block and neighboring blocks of the determined reference texture block based on a size of the current depth block being equal to or larger than a size of the reference texture block;

deriving motion information candidates of the current depth block based on the derived median value and motion information of neighboring blocks of the current depth block;

deriving the motion information of the current depth block based on the information for deriving the motion information and the motion information candidates; and performing prediction to generate predicted pixels of the current depth block based on the motion information of the current depth block, wherein a merge mode is applied to the current depth block, wherein the neighboring blocks of the reference texture block include a left neighboring block of the reference texture block and a top neighboring block of the reference texture block, wherein the motion information candidates include motion information comprising the median value as a motion vector, wherein the motion information of the current depth block is determined based on the motion information comprising the median value as the motion vector, wherein the specific disparity vector is determined for an area in the current depth picture, wherein the area for which the specific disparity vector is determined is split based on a quad tree structure, and wherein the reference texture block is a block of the reference texture picture in a reference view.

* * * * *